United States Patent [19]

Menon et al.

[11] Patent Number: 5,537,488
[45] Date of Patent: Jul. 16, 1996

[54] PATTERN RECOGNITION SYSTEM WITH STATISTICAL CLASSIFICATION

[75] Inventors: Murali M. Menon, Woburn; Eric R. Boudreau, Leominster, both of Mass.

[73] Assignee: Massachusetts Institute of Technology, Cambridge, Mass.

[21] Appl. No.: 122,705

[22] Filed: Sep. 16, 1993

[51] Int. Cl.$^6$ .................................................. G06R 9/00
[52] U.S. Cl. ....................... 382/170; 382/225; 382/228; 395/2.54
[58] Field of Search ........................ 382/225, 228, 382/159, 160, 170; 395/20, 23, 2, 2.4, 2.52, 2.54

[56] References Cited

U.S. PATENT DOCUMENTS

| | | | |
|---|---|---|---|
| 4,292,471 | 9/1981 | Kohn et al. | 382/225 |
| 4,326,259 | 4/1982 | Cooper et al. | 364/715 |
| 4,658,429 | 4/1987 | Orita et al. | 382/225 |
| 4,979,225 | 12/1990 | Tsujiuchi et al. | 382/170 |
| 5,075,896 | 12/1991 | Wilcox et al. | 382/225 |
| 5,181,259 | 1/1993 | Roruiz et al. | 382/225 |
| 5,187,751 | 2/1993 | Tanaka | 382/225 |
| 5,263,097 | 11/1993 | Katz et al. | 382/225 |
| 5,283,838 | 2/1994 | Togawa et al. | 382/160 |
| 5,295,198 | 3/1994 | Maney | 382/225 |
| 5,347,595 | 9/1994 | Bokser | 382/225 |

FOREIGN PATENT DOCUMENTS 0355748  2/1990  European Pat. Off. .

OTHER PUBLICATIONS

T. Kohonen, "An Introduction to Neural Computing," Neural Networks, 1(1):3–16, (1988).
G. A. Carpenter et al., "Self–Organization of Stable Category Recognition Codes for Analog Input Patterns," Proceedings of the First International Conference on Neural Networks, pp. 2–9, (1987).
S. Y. Kung, Digital Neural Networks, PTR Prentice Hall, p. 149, (1993).
K. Fukunaga, Introduction to Statistical Pattern Recognition, Academic Press, Orlando FL, pp. 324–332, (1972).
R. O. Duda and P. E. Hart, Pattern Classification and Scene Analysis, Wiley, New York, pp. 213–221, (1973).
IEEE 1985 Proceedings of the International Conference on Cybernetics and Society, Tuscon, Arizona, Nov. 12–15, 1985.
Keller, J. M., et al., "Membership Function Issues In Fuzzy Pattern Recognition," IEEE, pp. 210–214.

Primary Examiner—Joseph Mancuso
Attorney, Agent, or Firm—Hamilton, Brook, Smith and Reynolds

[57] ABSTRACT

A pattern recognition system is described. During training, multiple training input patterns from multiple classes of subjects are grouped into clusters within categories by computing correlations between the training patterns and present category definitions. After training, each category is labeled in accordance with the peak class of patterns received within the cluster of the category. If the domination of the peak class over the other classes in the category exceeds a preset threshold, then the peak class defines the category. If the contrast does not exceed the threshold, then the category is defined as unknown. The class statistics for each category are stored in the form of a training class histogram for the category. During testing, frames of test data are received from a subject and are correlated with the category definitions. Each frame is associated with the training class histogram for the closest correlated category. For multiple-frame processing, the histograms are combined into a single observation class histogram which identifies the subject with its peak class within a predefined degree of confidence. The system is incrementally trainable such that new training data can be added without retraining the system.

40 Claims, 18 Drawing Sheets

Distance Metric Submodule

Distance Decision Module

Add New Category Module

PATTERN RECOGNITION SYSTEM WITH STATISTICAL CLASSIFICATION

GOVERNMENT FUNDING

This invention was made with government support under Contract Number F19628-90-C-002 awarded by the Air Force. The government has certain rights in the invention.

BACKGROUND OF THE INVENTION

Pattern recognition systems automatically identify patterns of input data based on patterns previously received. A system is first trained by inputing multiple training patterns and forming categories. After training, the system receives a pattern for identification. It compares the pattern with the categories and, based on the comparisons, identifies the pattern as belonging to one of the categories.

SUMMARY OF THE INVENTION

The present invention is directed to a pattern recognition system and a method for recognizing input data patterns from a subject and classifying the subject. The system first performs a training operation in which input training patterns are received and grouped into clusters. Each cluster of training patterns is associated with a category having a category definition based on the training patterns in the cluster. As each training pattern is received, a correlation or distance is computed between it and each of the existing categories. Based on the correlations, a best match category is selected. The best match correlation is compared to a preset training correlation threshold. If the correlation is above the threshold, then the training pattern is added to the cluster of the best match category, and the definition of the category is updated in accordance with a learning rule to include the contribution from the new training pattern. If the correlation is below the threshold, a new category defined by the training pattern is formed, the cluster of the new category having only the single training pattern.

Training patterns are usually received from multiple classes of subjects. A class is a particular item or person which the network is trained to identify. A category is defined by particular features or views of the subjects. For example, if the system is used to visually classify automobiles by model, each model of automobile would be a separate class. Specific recognizable features of the automobiles, such as fenders of a particular shape or particular tires, could be categories. Since different models (classes) can have similar appearing fenders or tires (categories), the clusters of each category will generally include training patterns from more than one class. That is, since the fenders of different models may appear similar, the cluster of a fender category will include training patterns from more than one model. When training such a system, multiple photographs of each model (class) taken from different views and/or showing different features could be input to the system to form the categories.

In the case of face recognition, each class would be a separate person. The categories could be defined according to particular view orientations or facial features. To train a face recognition system, photographs showing several views of each person of a group of persons could be input to the system. The views could include front, left side and right side views as well as views of individual persons with and without glasses and/or with and without facial hair. Since more than one person can appear similar from a particular view or with a particular facial feature, each view or feature category can include several persons (classes).

Just as several classes can have similar appearing features and will as a result be grouped in feature clusters, features of different classes can also appear very different. As a result, different categories of corresponding features will be formed for different classes. For example, fenders or tires from different models of automobile may appear very different. So, multiple tire categories and fender categories can be formed, each containing training patterns from different models in its cluster. In the same way, different persons will likely appear different even at the same orientation. So, multiple categories will be formed for a single orientation.

It should also be noted that within a single class, multiple views, although taken from the same orientation, may appear in different categories. For example, several views of a single person taken from the front orientation may appear different enough to cause them to be grouped into different clusters. This is caused by many factors such as slight fluctuations in facial expression, lighting, etc.

To label categories, the system of the invention counts the number of training patterns of each class within the pattern cluster of each category. It uses the counts to generate a training class histogram for each category which shows the number of training patterns of each class within the category's cluster. The class in the category with the highest number of training patterns is termed the "peak class" of the category and represents the maximum point in the category's training class histogram. The system uses the training histograms of the categories to assign labels to the categories. It computes a category class contrast which indicates the degree to which the peak class dominates the other classes in the category. If the contrast exceeds a preset category labeling threshold, the category is labeled as the peak class. If it does not exceed the threshold, the category is labeled unknown.

Thus, the network defines a group of categories each of which is labeled in accordance with the number of patterns of a given class of pattern within the pattern cluster of the category. The category definition includes a training class histogram which indicates the probability of occurrence of a training pattern within the peak class of the category.

After training and labeling categories, the system of the invention can begin its testing operation during which frames of data in the form of test patterns from a subject can be associated with the categories such that the subject can be classified within a class. The processing of all test data from a subject to be classified is termed an "observation." Observations can comprise a single-frame test pattern of test data or multiple frames such as a video tape of a subject.

In multiple-frame observations, the test pattern frames are processed one at a time. As each test pattern is received, a correlation or distance between it and each of the category definitions is computed. The peak class of the best match category, along with the corresponding training class histogram, are associated with the test pattern. When all of the frames have been received, the individual training class histograms are combined to form a single observation class histogram.

In the preferred embodiment, the observation class histogram is formed by accumulating the training class histograms associated with each test data frame from the subject. The accumulation of histograms is performed according to an accumulation rule similar to the learning rule used to define the categories during the training operation. After the first data frame is received, the observation class histogram becomes the training histogram for the category associated with the data frame. Training histograms associated with subsequent data frames are added to the observation class histogram according to the accumulation rule. To update the observation histogram to include the histogram for a new test pattern, the pattern counts for each class in the current observation class histogram are subtracted from corresponding class counts of the incoming new histogram. The differences in counts are each multiplied by the accumulation rate $\gamma$. This product is then added to the corresponding class pattern counts for the current observation class histogram to obtain the updated observation class histogram.

In another embodiment, the individual training histograms are accumulated to create the observation class histogram by simply adding the individual histograms together. In another embodiment, the contribution of each class to the observation histogram is determined by scaling by 100 the cluster class contrast for the cluster containing each class. The resulting scaled histograms are then simply added together to form the observation class histogram. In another embodiment, only the peak class of each category is used. The contribution of the peak class to the observation histogram is calculated by scaling the class contrast of the category by 100. In still another embodiment, the histograms are not actually accumulated. Rather, a simple count is computed of the number of test data frames associated with each peak class to determine the contribution of that class to the observation histogram. As each test frame is received, it is identified as being within the peak class of the category with which it is associated. During the observation, a running count is kept of the number of frames identified with each class. The observation class histogram is simply a plot of the counts for each peak class made during the observation.

After the observation class histogram is generated, an observation class contrast is computed as a measure of the domination by the peak class of the observation histogram. If the contrast exceeds a preset classification threshold, the subject is classified as being the peak class. If the contrast is below the threshold, the subject is classified as unknown. Also, if the peak class of the observation class histogram is an unknown class, the subject is classified as unknown.

For single-frame observations, the correlation or distance between the test frame and each of the category definitions is computed. The peak classes of a preselected number k of categories having the highest correlations with the test pattern is then assembled into a "k-nearest neighbor" observation class histogram. The contribution of each class to the k-nearest neighbor histogram is determined by scaling the class contrast of the category from which the class was taken. A k-nearest neighbor observation class contrast is computed which indicates the degree to which the peak class in the k-nearest neighbor observation histogram dominates the other classes. If this contrast is above a predetermined classification threshold, the test pattern is classified as the peak class. If it is below the threshold, the test pattern is classified as unknown. As in the multiple-frame case, if the peak class of the observation histogram is an unknown class, the test pattern will be classified as unknown.

In one embodiment, the system classifies subjects by processing patterns of multiple data types from the subject, for example, video and voice data. In this embodiment, multiple pattern recognition systems are used, one system for each data type. Each of the systems operates individually during training and category labeling to set up its own set of categories. During the testing operation, each network receives data patterns of its corresponding data type, associates its patterns with categories and corresponding class histograms, and generates an observation class histogram accordingly. The system then fuses the data-type-specific observation class histograms, i.e, the voice observation class histogram and the video observation class histogram, to generate a cumulative final decision class histogram. The peak class contrast for the cumulative final decision class histogram is computed, and, if it is above a threshold, the subject is classified as the peak class of the cumulative histogram. Thus, the system combines the pattern recognition of both voice and visual data into one cumulative subject classification having a higher degree of confidence than either of the two individual networks.

The present invention provides numerous advantages in pattern recognition and subject classification. The system combines the learning features of adaptive pattern recognition systems such as neural networks with statistical decision making to perform its classifications. The definition of categories during training, the labeling of the categories and the output classifications are all performed in terms of histograms. Thus, the classifications are associated with a probability of correct classification. This provides the user of the system with an indication of the degree of confidence associated with each classification. This type of statistical classification can be more useful to the user than the "hard" classification of other systems.

Also, the statistical methods of the present invention allow for classifying patterns as unknown. If the degree of confidence in a classification is lower than a preset desired level, the subject is labeled as unknown. This feature is important in many applications such as medical diagnostic testing where it is more desirable that a questionable item of test data be classified as unknown than be misidentified.

Also, the system can be incrementally trained. As described above, after a set of training patterns is input to train the system, it can begin classifying subjects. If new training data becomes available, the system can be trained on the new data without completely retraining the system. The new data is input during a new training operation. The new data will result in new categories being formed or in modification of the definitions of the old categories. This can save considerable processing time when there are many training input patterns.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
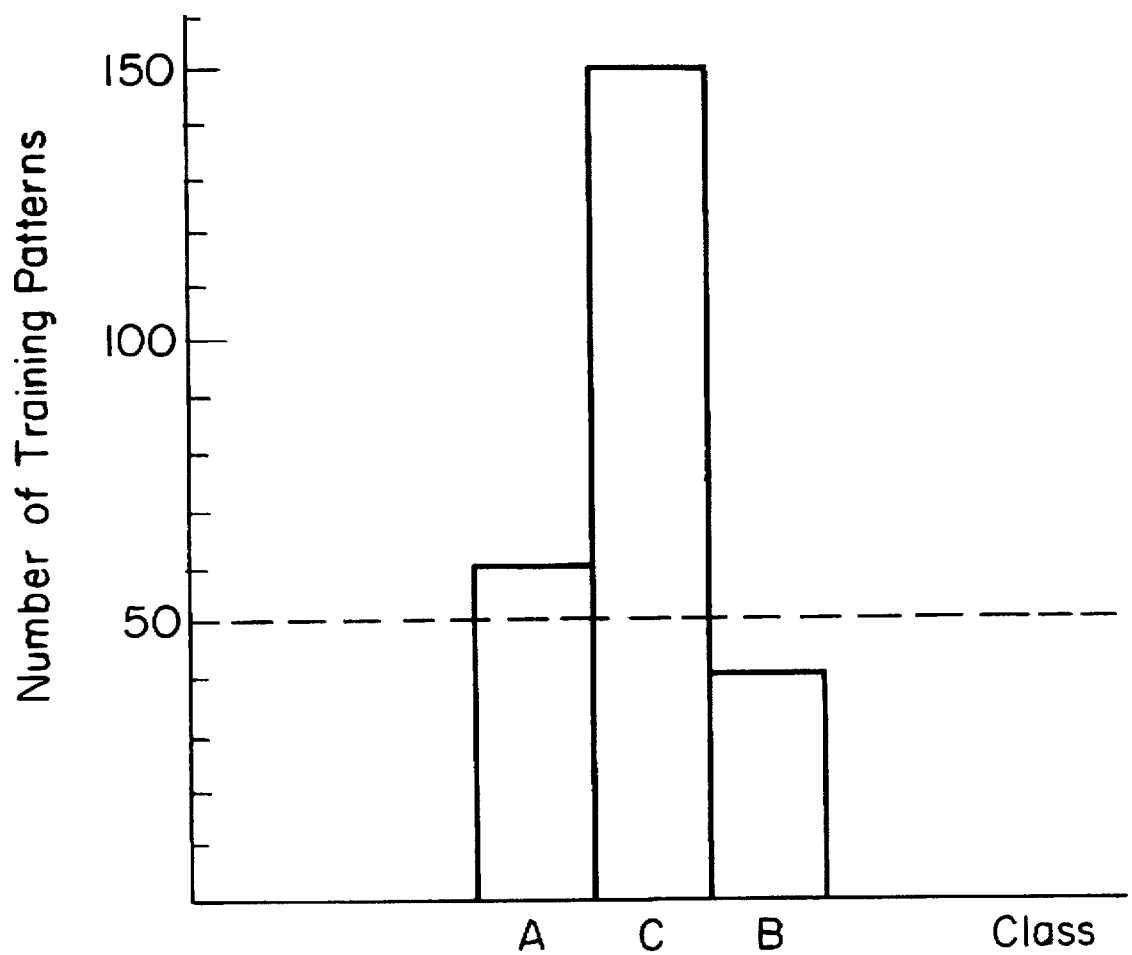
FIG. 1 is a schematic illustration of a class histogram in accordance with the present invention.

When the system of the present invention is trained, it receives training data patterns from various subjects or classes. In the case of a face recognition system, these patterns may include photographs of individual persons from several different orientations and/or exhibiting several different facial expressions. Photographs may also be shown of subjects with and without eyeglasses, with and without facial hair, etc. Voice data from different persons (classes) can also be received. As another example, in the case of a system used to identify semiconductor wafer defects, visual images of different types of defects as well as images of wafers having no defects can be received for training.

Each training pattern is associated with a known class and takes the form of a feature pattern vector $I_{INP}$. Each category definition $I_k$ is expressed in a vector format compatible with the feature vector. As each pattern vector is received, a correlation $C_{TRN}$ between it and each existing category definition is performed. In the case of a face recognition system, the correlation is computed according to $$C_{TRN} = \frac{I_{INP} \cdot I_k}{\|I_{INP}\| \|I_k\|} \text{ ; where} \quad (1)$$

$C_{TRN}$ is the training correlation, $I_{INP}$ is the input feature vector, $I_k$ is the present category definition vector, and $I_{INP} \cdot I_k$ is the vector dot product of $I_{INP}$ and $I_k$.

The correlation $C_{TRN}$ is then compared to a preset training threshold $\lambda_{TRN}$. If a category is found for which the correlation $C_{TRN}$ exceeds the threshold $\lambda_{TRN}$, then the training pattern is added to the cluster of that category, and the definition vector $I_k$ of that category is modified to incorporate the effects of the feature vector $I_{INP}$ of the input pattern. If more than one category has a correlation $C_{TRN}$ above the threshold $\lambda_{TRN}$, $I_k$ for the best match category, i.e., the category with the highest correlation, is modified and the training pattern is added to the cluster of that category. $I_k$ is modified in accordance with a learning rule given by $$I_k^{NEW} = I_k^{OLD} + \alpha(I_{INP} - I_k^{OLD}) \quad (2);$$

where $I_k^{NEW}$ is the resulting category definition vector after modification, $I_k^{OLD}$ is the category definition vector before modification, $\alpha$ is a user defined "learning rate" which governs the rate of cluster update, and $I_{INP}$ is the input feature vector.

For $\alpha=1$, $I_k^{NEW}=I_{INP}$, i.e., the input vector replaces the category definition vector; and for $\alpha=0$, $I_k^{NEW}=I_k^{OLD}$, i.e., no category definition update occurs. A high $\alpha$ value indicates fast learning, and a low $\alpha$ value indicates slow learning. Typically, the learning rate $\alpha$ is set to a value between 0.2 and 0.5 to suppress small variations due to noise and shifts in the input training patterns and to simultaneously reinforce consistent features in the input vectors.

If after computing correlations $C_{TRN}$ for each category, no correlation is found to exceed the training threshold $\lambda_{TRN}$, then a new category is formed. The definition vector $I_k$ of the new category is identical to the feature vector $I_{INP}$ of the input training pattern, and the cluster of the new category contains only the single input pattern.

The cluster of each category is divided into memory bins, each of which is identified with a specific class. As each input training pattern comes into a cluster, it is stored in the bin which is associated with its class. For example, if a training pattern from a certain person B is associated with a best match category 5, the input pattern is stored in the person B bin of the cluster of category 5 and the pattern count for the bin is incremented. In each category, the class with the highest bin count is the peak class of that category.

Some category definitions change many times as patterns of training data are received. By the time the end of the training set is reached, some category definition vectors are substantially different from what they were at the beginning of the set. The variations can be so great that some patterns from the beginning of the training set could be included in clusters other than those in which they are stored if they were received again for training. In order to eliminate this condition and stabilize the category definitions, the training set can be repeatedly reprocessed until none of the training patterns change clusters. In a preferred embodiment, the training set will usually be processed no more than five times.

After the set of training patterns has been completely processed as described above to form the clusters, each category is labeled with a class name. In the preferred embodiment, the categories are labeled according to the class bin counts. A category may be labeled as its peak class or it may be labeled an unknown class depending upon the degree to which the peak class dominates the cluster of the category. To make this determination, a cluster class contrast $CC_c$ is computed for each category by taking the number of training patterns for the peak class $N_{PEAK}$ and subtracting the average number of patterns for the remaining classes $N_{MEAN}$. The result is normalized by dividing this difference by the total number of patterns $N_{TOTAL}$ in the cluster. That is, $$CC_c = \frac{N_{PEAK} - N_{MEAN}}{N_{TOTAL}}. \tag{3}$$

Thus, the class contrast for a cluster formed from a single class will be unity. The class contrast for a cluster in which no single class dominates will be close to zero, since the difference between the peak and the mean will be very small.

After the entire training set has been processed, the class bin counts for each cluster are plotted to form a training class histogram for each category. FIG. 1 schematically depicts a typical category training class histogram. This category was the best match category for a total of 200 training patterns. Of these 200 patterns, 60 were from class A, 40 were from class B and 150 were from class C. Class C is the peak class of the category; and $N_{PEAK}=150$, $N_{MEAN}=50$ and $N_{TOTAL}=250$. Therefore, the class contrast $CC_c$ is given by $$CC_c = \frac{150-50}{250} = 0.4.$$

After the class contrast $CC_c$ is computed for a cluster, it is compared to a preset cluster class contrast labeling threshold $\lambda_L$. If the contrast $CC_c$ exceeds the threshold $\lambda_L$, then the category is labeled with the name or identification of the peak class of the cluster. If the contrast $CC_c$ does not exceed the threshold $\lambda_L$, the category will be labeled as unknown.

As previously stated, in the class histogram of FIG. 1, the class contrast $CC_c=0.4$. If the class contrast labeling threshold $\lambda_L$ is set at 0.3, then this category will be labeled as class C. In that case, during subsequent testing, a test pattern for which the category is the best match category will be associated with class C. On the other hand, if the class contrast threshold is set at 0.6 for example, the category will be labeled as unknown. In that case, during testing, if the category is the best match category of an input test pattern, that test pattern will be identified as unknown.

It can be seen from the foregoing description that the statistical methods employed in the invention provide an indication of the degree of certainty associated with pattern classifications. By properly choosing the training and labeling thresholds $\lambda_{TRN}$ and $\lambda_L$, one can assure that the system is trained in a fashion appropriate for the application. For example, setting a very high training threshold $\lambda_{TRN}$ will cause many categories to be formed during training, resulting in a look-up table type of classification during testing with a high degree of confidence in the classification. A low training threshold $\lambda_{TRN}$ will result in fewer categories which contain more classes of training patterns. The class contrast labeling threshold $\lambda_L$ is set according to the amount of certainty required in a classification before a test pattern can be associated with a particular class. If a category has a high labeling threshold $\lambda_L$ and that category is labeled with a class name instead of being labeled unknown, then that class exhibits a strong domination of the category. An incoming test pattern which correlates with the category will most likely belong to the dominating class. Thus, a high class contrast labeling threshold $\lambda_L$ indicates a high degree of confidence in the classification.

After training and category labeling are complete, the system is ready to classify input test patterns during the testing operation. Test data can consist of multiple frames of data such as a real-time video observation or it can be a single data frame such as a snapshot of the subject.

In the case of multiple-frame observation testing, a testing correlation $C_{TEST}$ similar to the training correlation $C_{TRN}$ is computed between each individual frame of testing data and each of the category definitions. A best match category having the highest correlation with the test frame pattern is selected. If correlation $C_{TEST}$ of the best match category is above a pre-set testing correlation threshold $\lambda_{TEST}$, then the input frame is associated with the best match category and its corresponding training class histogram generated for the category during training. When the observation is complete, each frame of data is associated with a single training class histogram. These training class histograms are combined to form a single observation class histogram associated with the input subject.

In a preferred embodiment, the observation class histogram is a weighted accumulation of the training class histograms associated with the data frames. The training histograms are accumulated in the observation histogram as the data frames are processed by updating the observation histogram according to an accumulation rule given by $$H_{NEW} = H_{OLD} + \gamma(H_{current} - H_{OLD}) \tag{4};$$

where $H_{NEW}$ is the observation histogram after being updated according to the accumulation rule, $H_{OLD}$ is the observation histogram before being updated, $H_{CURRENT}$ is the training histogram associated with the current data frame being added to the observation histogram, and $\gamma$ is the accumulation rate.

H refers to the bin counts of training patterns in each class of each of the histograms. That is, referring to FIG. 1 for example, H for this histogram would represent the 150 patterns of class C, the 60 patterns of class A and the 40 columns of class B. So, when an existing observation histogram $H_{OLD}$ is updated according to the accumulation rule, the bin counts for each class in the histogram are subtracted from the bin counts of the same classes in the current training histogram. The difference in bin counts for each individual class is multiplied by the accumulation rate $\gamma$. The weighted bin count differences for each of the classes are then added to their corresponding class bin counts in the existing observation histogram $H_{OLD}$ to obtain the updated observation histogram $H_{NEW}$. When the last test pattern from the subject is received, the last associated training histogram is accumulated within the observation class histogram to form the final observation class histogram.

Figure 2A:
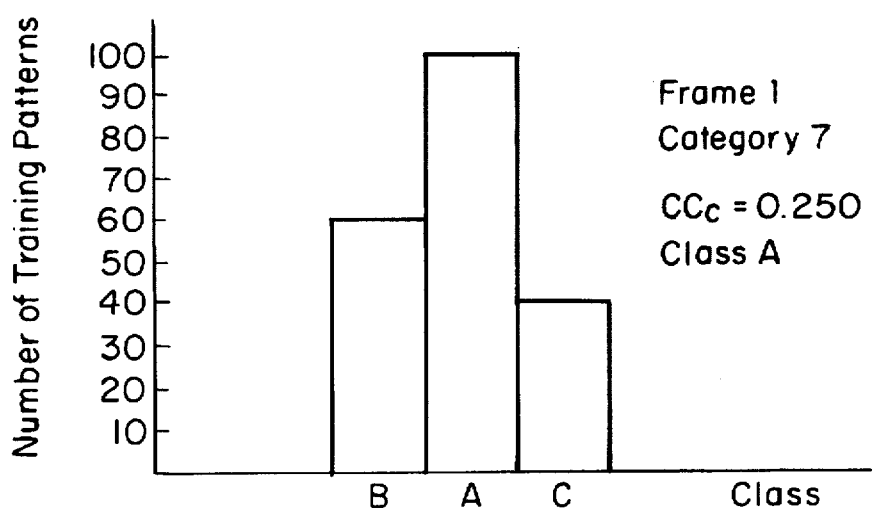
FIGS. 2A–2E are training class histograms in accordance with the present invention, each of which is associated with a single frame of input test data.
Figure 2B:
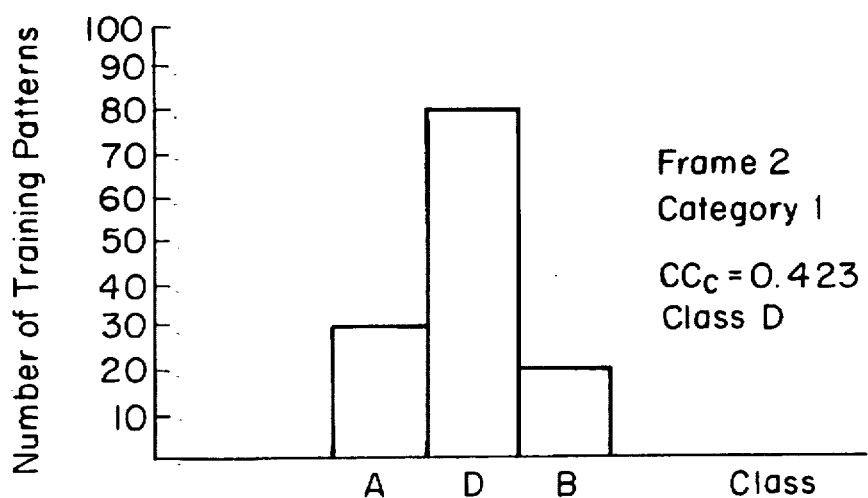

FIGS. 2A–2E and 3A–3E illustrate the process of accumulating individual training class histograms from frames of input test data to generate the observation class histogram. FIGS. 2A–2E each represent the training class histogram for a category which is associated with a single frame of input test data. For simplicity, the data frames will be referred to as frames 1–5, with FIG. 2A representing the histogram for frame 1, FIG. 2B representing the histogram for frame 2, and so on. The categories are arbitrarily labeled categories 7, 1, 4, 8 and 2. It will be understood that each frame need not be associated with a unique category as in this illustration. It is likely that in actual testing, multiple data frames will be associated with a single category.

Frame 1 of test data shown in FIG. 2A was associated by the system as described above with category 7. When the system was trained, a total of 200 training patterns were stored in the category 7 cluster. Of these patterns, 100 were from class A, 60 were from class B and 40 were from class C. The cluster class contrast $CC_c$ computed from equation 3 above is given by $$CC_c = \frac{100-50}{200} = 0.250.$$

For the purpose of-this illustration, it is assumed that during training the cluster class contrast labeling threshold $\lambda_L$ was set at 0.200. Therefore, the class contrast for category 7 exceeded the labeling threshold, and consequently, category 7 was labeled as class A, the peak class of the category.

Figure 2C:
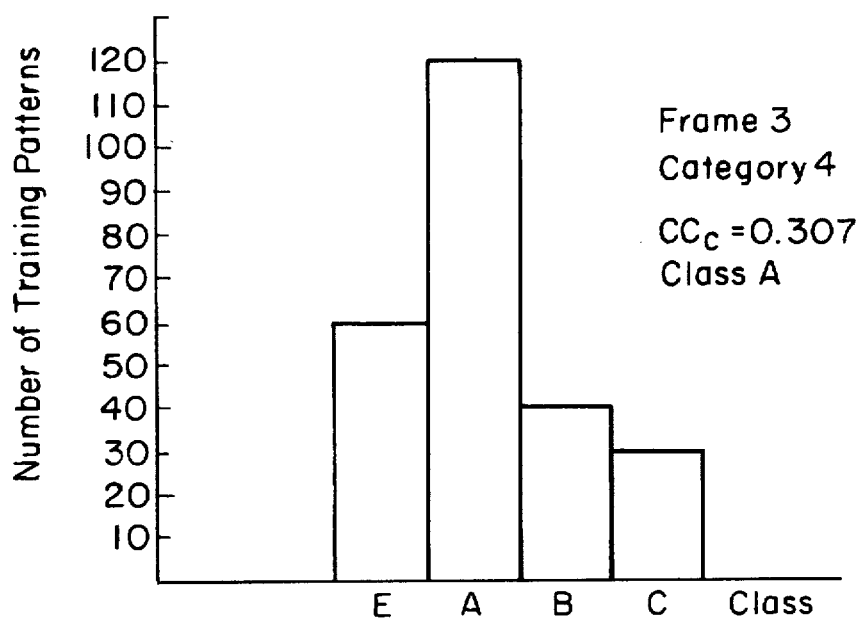
Figure 2D:
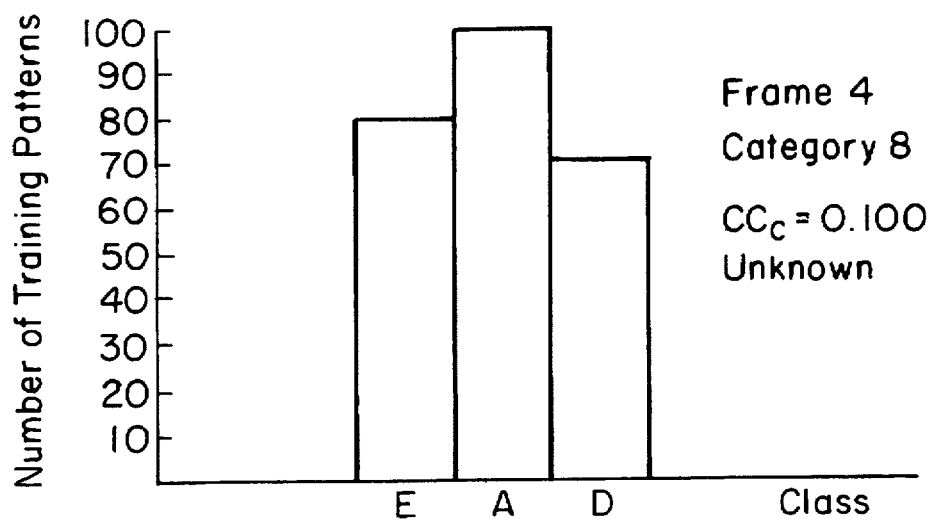
Figure 2E:
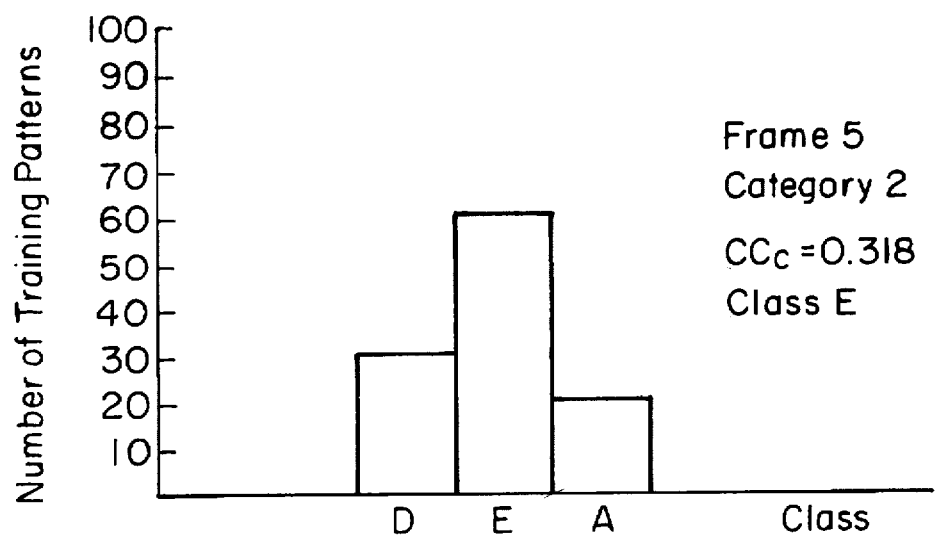

FIG. 2B shows that frame 2 of the test data from the subject is associated with category 1. The cluster class contrast $CC_c$ of category 1 is 0.423 which is greater than $\lambda_L$. Therefore, category 1 was labeled as class D. FIG. 2C indicates that frame 3 is associated with category 4 having a class contrast $CC_c$ of 0.307 and being labeled as class A. As shown in FIG. 2D, frame 4 of the test data is associated with category 8. Category 8 contains three classes A, B and C and has a cluster class contrast of 0.100, below the labeling threshold $\lambda_L$ of 0.200. Therefore, category 8 is labeled as unknown. As shown in FIG. 2E, frame 5 of the test data was associated with category 2, having a cluster class contrast $CC_c$ of 0.318 and therefore being labeled as class E.

Figure 3A:
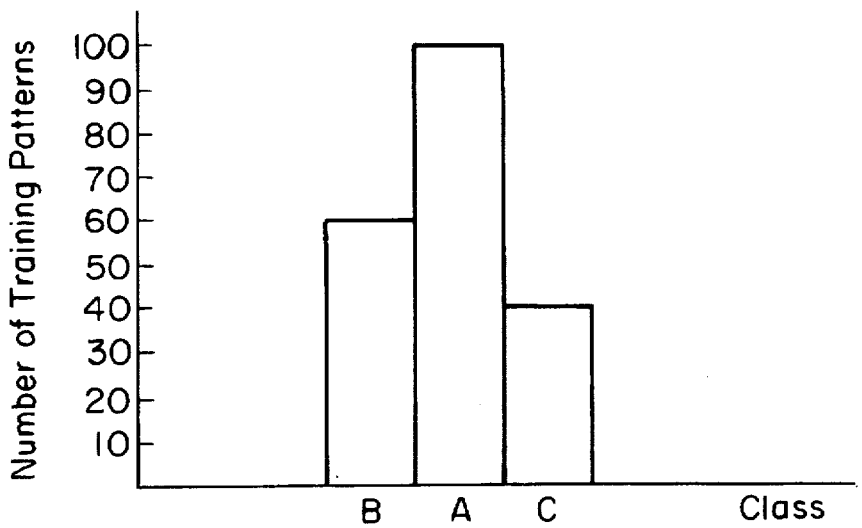
FIGS. 3A–3E show the process of accumulating training class histograms to create the observation class histogram in accordance with the present invention.
Figure 3B:
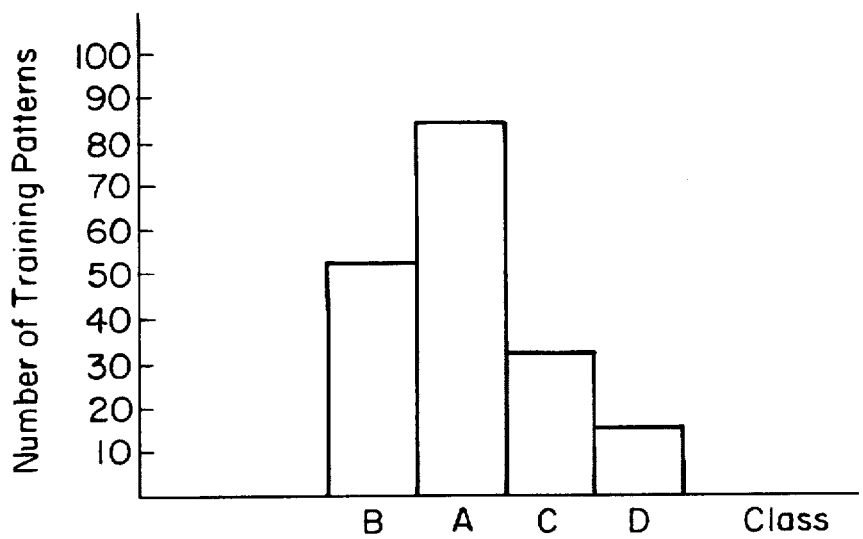
Figure 3C:
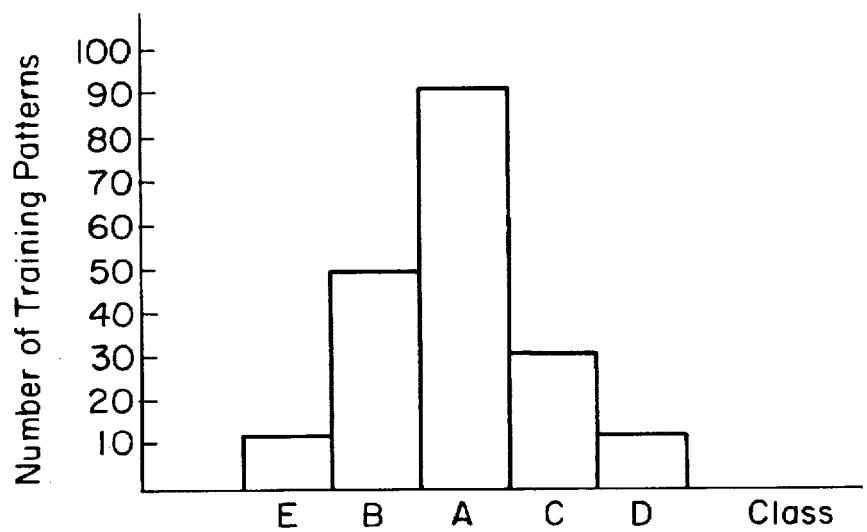
Figure 3D:
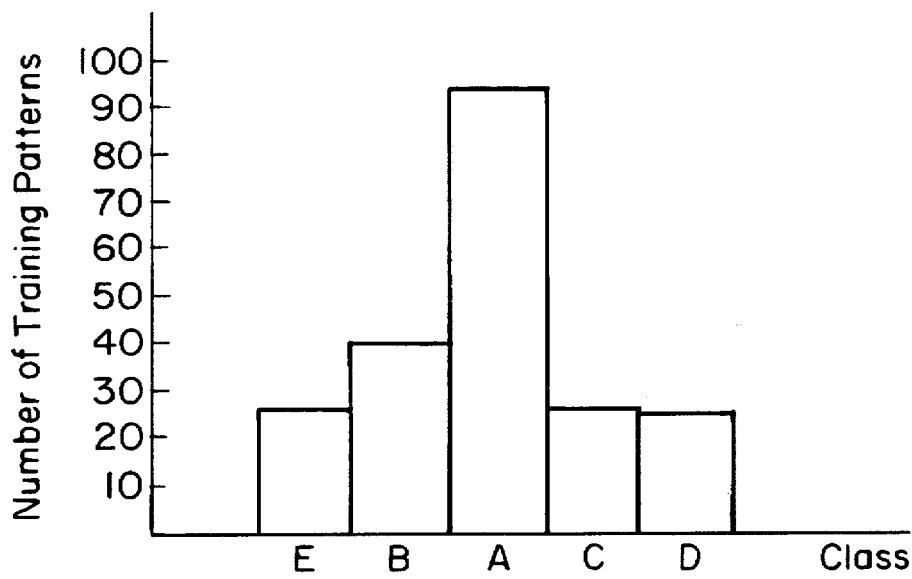
Figure 3E:
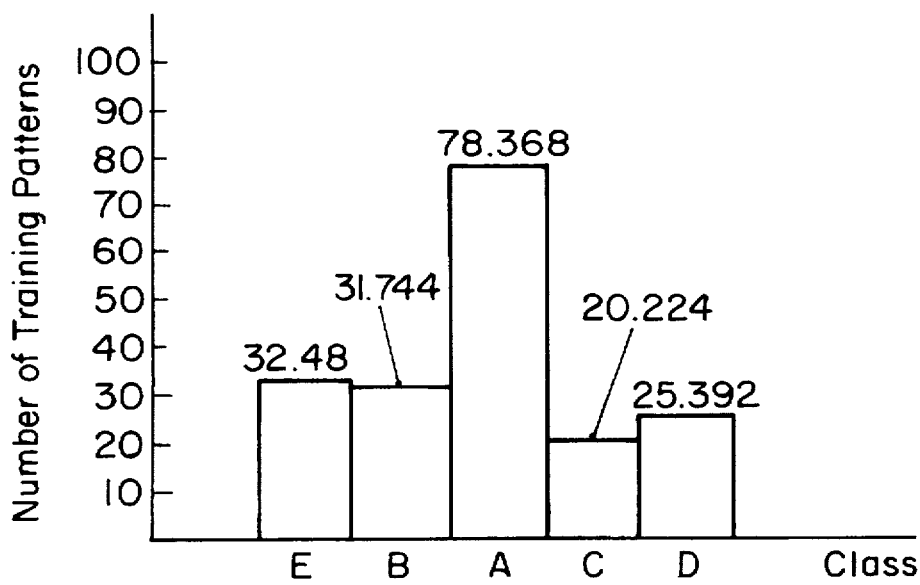
Figure 4A:
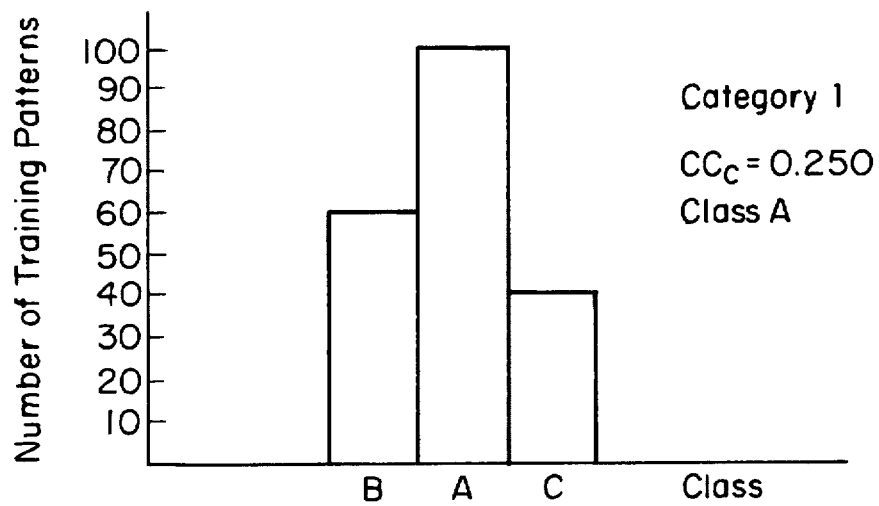
FIGS. 4A–4E show five nearest neighbor training class histograms for a single frame of input test data.
Figure 4B:
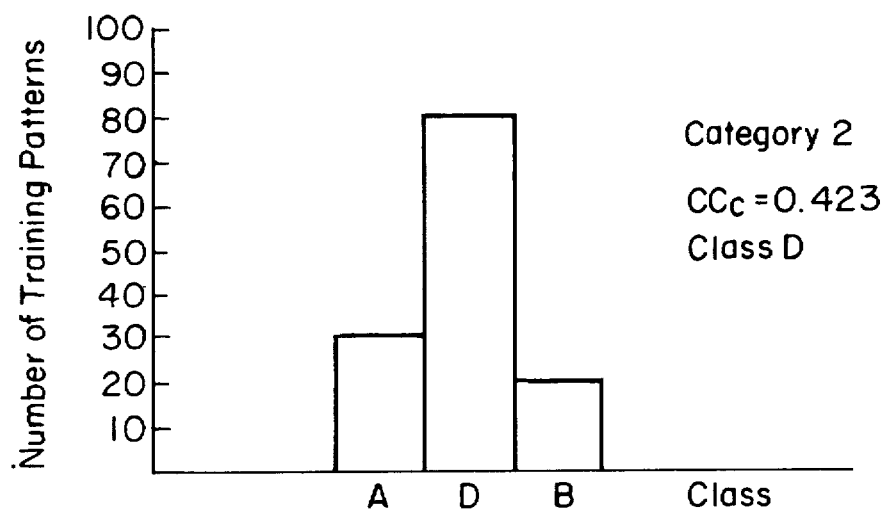
Figure 4C:
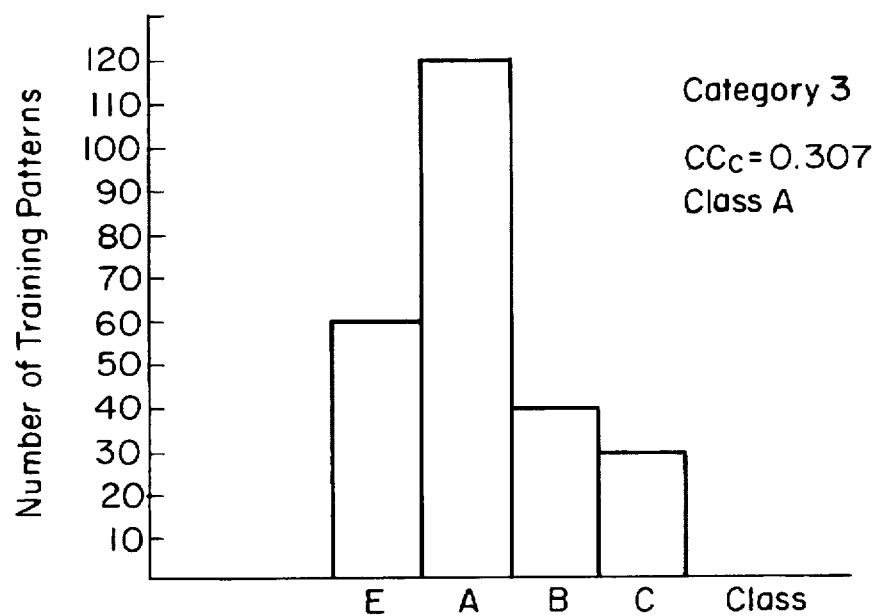
Figure 4D:
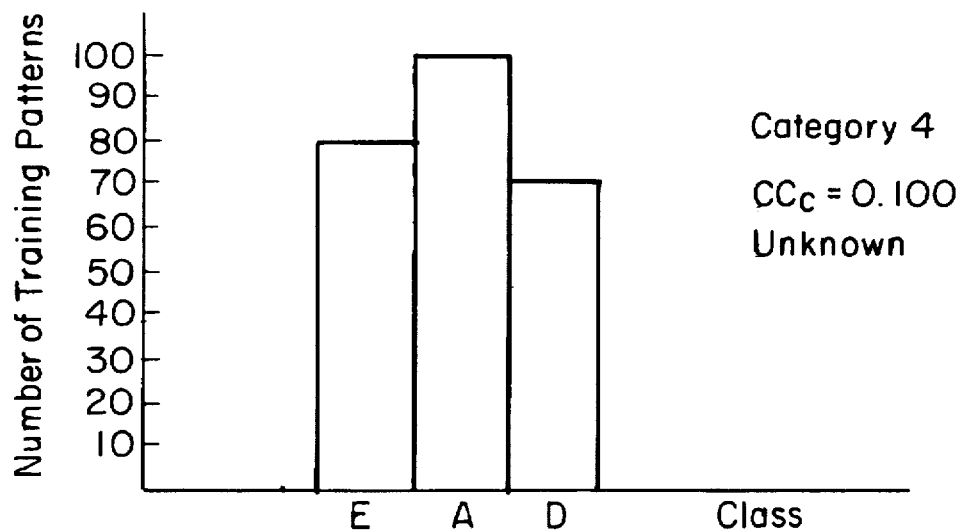
Figure 4E:
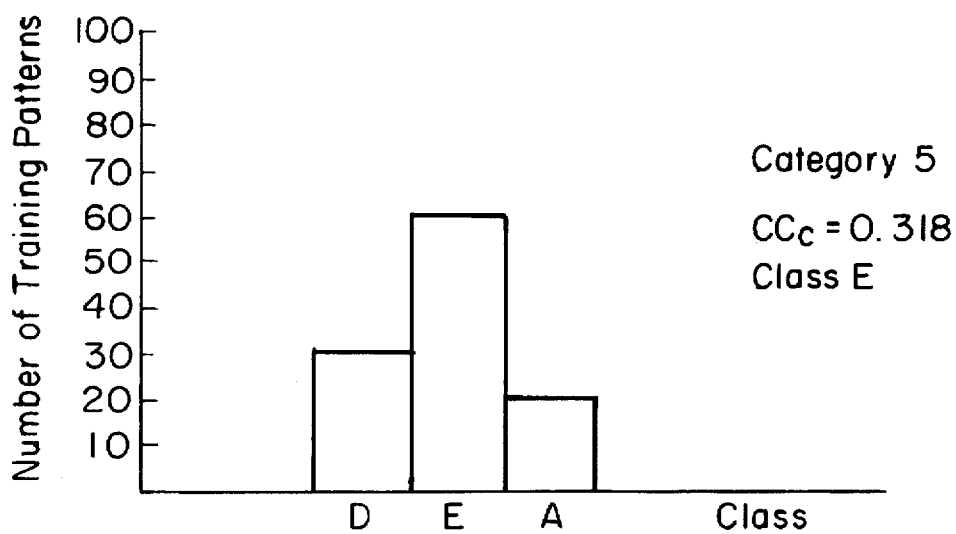

As described above, the observation class histogram is created by accumulating each of the individual training histograms shown in FIGS. 2A–2E in accordance with the accumulation rule in equation (4). FIGS. 3A–3E illustrate the stages of accumulation of the observation class histogram as the data frames are received by the system. That is, FIG. 3A shows the observation class histogram after frame 1 is received; FIG. 3B shows the observation class histogram after frame 2; and so on. Finally, FIG. 3E shows the final observation class histogram in which all five individual training histograms from the five data frames are accumulated.

After the first frame of data is received, the observation histogram is identical to the training histogram for the category associated with frame 1. This is shown in FIG. 3A in which the observation histogram is the same as the training histogram for frame 1 shown in FIG. 2A.

When frame 2 is received, contributions for all of the classes in the first two training histograms are computed from the accumulation rule in equation 4. For this illustration, the accumulation rate $\gamma$ is chosen to be 0.2. The class Contributions in the updated observation class histogram are computed by $$
\begin{aligned}
A_{NEW} &= A_{OLD} + \gamma(A_{CURRENT} - A_{OLD}) \\
&= 100 + .2(30 - 100) \\
&= 86 \\
B_{NEW} &= 60 + .2(20 - 60) \\
&= 52 \\
C_{NEW} &= 40 + .2(0 - 40) \\
&= 32 \\
D_{NEW} &= 0 + .2(80 - 0) \\
&= 16
\end{aligned}
$$

The observation class histogram generated from the above bin counts after frame 2 is shown in FIG. 3B.

When frame 3 is received, the category 4 training histogram as shown in FIG. 2C is accumulated within the observation class histogram. The resulting histogram is shown in FIG. 3C. The heights of the class indicators are determined by the following.

$$
\begin{aligned}
A_{NEW} &= 86 + .2(120 - 86) \\
&= 92.8 \\
B_{NEW} &= 52 + .2(40 - 52) \\
&= 49.6 \\
C_{NEW} &= 32 + .2(30 - 32) \\
&= 31.6 \\
D_{NEW} &= 16 + .2(0 - 16) \\
&= 12.8 \\
E_{NEW} &= 0 + .2(60 - 0) \\
&= 12
\end{aligned}
$$

Frame 4 was associated with category 8, which is labelled unknown. Nevertheless, the historgram is combined with the observation histogram in the same fashion as histograms for categories with class labels. FIG. 3D shows the observation histogram after the category 8 training histogram is added. The heights of the class indicators are computed as follows.

$$
\begin{aligned}
A_{NEW} &= 92.8 + .2(100 - 92.8) \\
&= 94.24 \\
B_{NEW} &= 49.6 + .2(0 - 49.6) \\
&= 39.68 \\
C_{NEW} &= 31.6 + .2(0 - 31.6) \\
&= 25.28 \\
D_{NEW} &= 12.8 + .2(70 - 12.8) \\
&= 24.24 \\
E_{NEW} &= 12 + .2(80 - 12) \\
&= 25.6
\end{aligned}
$$

When frame 5 is processed, the final training histogram associated with category 2 is accumulated within the observation class histogram. The completed observation class histogram is shown in FIG. 3E. The heights of the class indicators are computed by the following.

$$
\begin{aligned}
A_{NEW} &= 94.24 + .2(20 - 94.24) \\
&= 79.392 \\
B_{NEW} &= 39.68 + .2(0 - 39.68) \\
&= 31.744 \\
C_{NEW} &= 25.28 + .2(0 - 25.28) \\
&= 20.224 \\
D_{NEW} &= 24.24 + .2(30 - 24.24) \\
&= 25.392 \\
E_{NEW} &= 25.6 + .2(60 - 25.6) \\
&= 32.48
\end{aligned}
$$

Other approaches may also be used to form the observation histogram. For example, instead of using the accumulation rule to combine the individual training histograms, they may simply be added together. The bin count for each class in the observation histogram would be the total of the bin counts for that class from all of the training histograms. For the illustration described above, the individual class contributions to the observation histogram would be calculated as follows.

$$A = 100 + 30 + 120 + 100 + 20$$
$$= 370$$
$$B = 60 + 20 + 40$$
$$= 120$$
$$C = 40 + 30$$
$$= 70$$
$$D = 80 + 70 + 30$$
$$= 180$$
$$E = 60 + 80 + 60$$
$$= 200$$

Another method of forming the observation class histogram involves using the cluster class contrast $CC_c$ of each category associated with the data frames. In this method, only the peak class from each of the 5 categories is used. The contribution of the peak classes to the observation histogram is calculated by scaling the cluster class contrast $CC_c$ of the peak classes category by 100 and adding all of the scaled contrasts together. For example, in the illustration above, the individual class contributions will be calculated as follows.

$$A = 100(0.250 + 0.307)$$
$$= 55.7$$
$$B = 0$$
$$C = 0$$
$$D = 100(0.423)$$
$$= 42.3$$
$$E = 100(0.318)$$
$$= 31.8$$
$$\text{Unknown} = 100(0.100)$$
$$= 10$$

The observation histogram so formed would have only four classes, namely, A, D, E and Unknown. Classes B and C would not be included in the observation class histogram because they were not peak classes of any category associated with any of the test frames. It should also be noted that the contribution of frame 4 is added to the unknown class rather than class A since the class contrast $CC_c$ was below the labeling threshold.

A fourth method of producing the observation class histogram also involves using the cluster class contrast $CC_c$ for the categories. In this method, though, all of the classes from each category are used in the observation class histogram instead of only the peak class. Rather than simply scaling the peak class by the class contrast $CC_c$ as in the previous method, the entire histogram, i.e., all of the bin counts for all classes in the category, are multiplied by the class contrast of the category and accumulated within the observation class histogram. In this method, the class contributions to the observation class histogram are calculated as follows.

$$A = 100(0.250) + 30(0.423) + 120(0.307) +$$
$$100(0.100) + 20(0.318)$$
$$= 90.89$$

-continued
$$B = 60(0.250) + 20(0.423) + 40(0.307) +$$
$$0.(0.100) + 0(0.318)$$
$$= 35.74$$
$$C = 40(0.250) + 0(0.423) + 30(0.307) +$$
$$0(0.100) + 0(0.318)$$
$$= 19.21$$
$$D = 0(0.250) + 80(0.423) + 0(0.307) +$$
$$70(0.100) + 30(0.318)$$
$$= 50.38$$
$$E = 0(0.250) + 0(0.423) + 60(0.307) +$$
$$80(0.100) + 60(0.318)$$
$$= 45.5$$

In a fifth method of producing the observation class histogram, the contribution of a class to the observation histogram is simply the number of frames of test data which are associated with a category having that class as its peak class. That is, as a test frame is received, it is associated with a category which has a peak class or unknown label. A running count is made for each class of the number of frames received for that class. When all of the test frames have been received, the height of each class indicator in the observation histogram is simply the number of test data frames received for that class. For example, in the illustration above, A=2, B=0, C=0, D=1, E=1 and Unknown=1.

After the observation histogram is created, an observation class contrast $CC_O$, analogous to the cluster class contrast $CC_c$, is computed. The observation class contrast $CC_O$ is an indication of the extent to which the peak class of the observation histogram dominates the other classes. It is computed by taking the contribution of the peak class, subtracting the mean of the contributions from the other classes and dividing that difference by the total of the class contributions. For the observation histogram of FIG. 3E, $$CC_0 = \frac{79.392 - 27.46}{189.232} = 0.274.$$

If this number exceeds a preset observation class contrast classification threshold $\lambda_{CL}$, then the subject is classified as being class A, the peak class of the observation histogram. If it does not exceed the threshold $\lambda_{CL}$, then the subject is classified as unknown.

The pattern recognition system of the present invention can also classify subjects when only a single frame of test data is received. During testing, the system calculates the test correlation $C_{TEST}$ between the input pattern and each of the categories. The categories are then sorted according to their correlation to the input pattern. A pre-set number k of categories having the closest correlations to the test pattern are then used to form a "k-nearest neighbor" class histogram. The peak class from each of the k categories is included in the histogram. The contribution of each class is determined by the cluster class contrast $CC_c$ of its category scaled by 100. It should be noted that only those categories which have a correlation $C_{TEST}$ with the input pattern above the testing threshold $\lambda_{TEST}$ are included in the k-nearest neighbor histogram, even if that means that fewer than k categories will be included. Also, in the case of k=1, the subject is simply identified as the class of the best match category.

Figure 5:
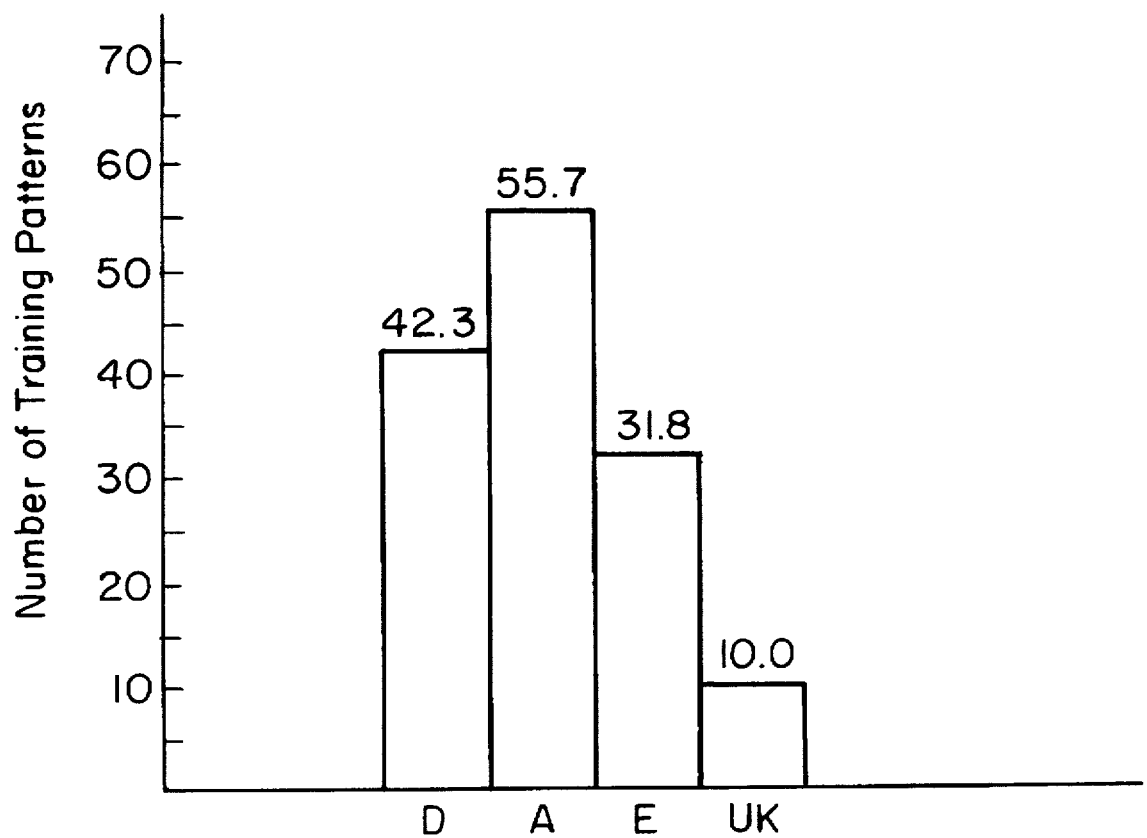
FIG. 5 shows the k-nearest neighbor class histogram created by combining the training histograms of FIGS. 4A–4E in accordance with the present invention.

FIGS. 4A–4E and FIG. 5 illustrate the process of generating the k-nearest neighbor histogram. In this illustration, K=5. FIGS. 4A–4E show the training histograms for the 5 categories having the closest correlations with the single input test frame. FIG. 5 shows the k-nearest neighbor histogram which results from combining the training histograms of FIGS. 4A–4E. The contribution of each class to the observation histogram is computed by scaling by 100 the cluster class contrast $CC_c$ of the category of which the class is the peak class. The individual class contributions for the illustration of FIGS. 4A–4E are calculated as follows.

$$
\begin{aligned}
A &= 100(0.250 + 0.307) \\
&= 55.7 \\
D &= 100(0.423) \\
&= 42.3 \\
E &= 100(0.318) \\
&= 31.8 \\
\text{Unknown} &= 100(0.100) \\
&= 10
\end{aligned}
$$

The results of these calculations give the heights of the class indicators in the k-nearest neighbor histogram of FIG. 5.

A k-nearest neighbor class contrast based on the peak class in k-nearest neighbor histogram is then calculated. If this class contrast exceeds a preset threshold, then the subject is classified as the peak class in the output histogram. Otherwise, the subject is reported as unknown. The class contrast for the k-nearest neighbor histogram of FIG. 5 is given by $$CC_{kNN} = \frac{55.7 - 28.0}{139.8} = 0.198.$$

The invention described to this point has involved a single pattern recognition system which classifies a single type of data from the subject, for example, visual image data of a person's face. In many applications though, it is desirable to have another type of data from the same subject to confirm or to increase the confidence level in the classification. For example, it would be beneficial to be able to simultaneously classify a person by video data and by voice data.

Figure 6:
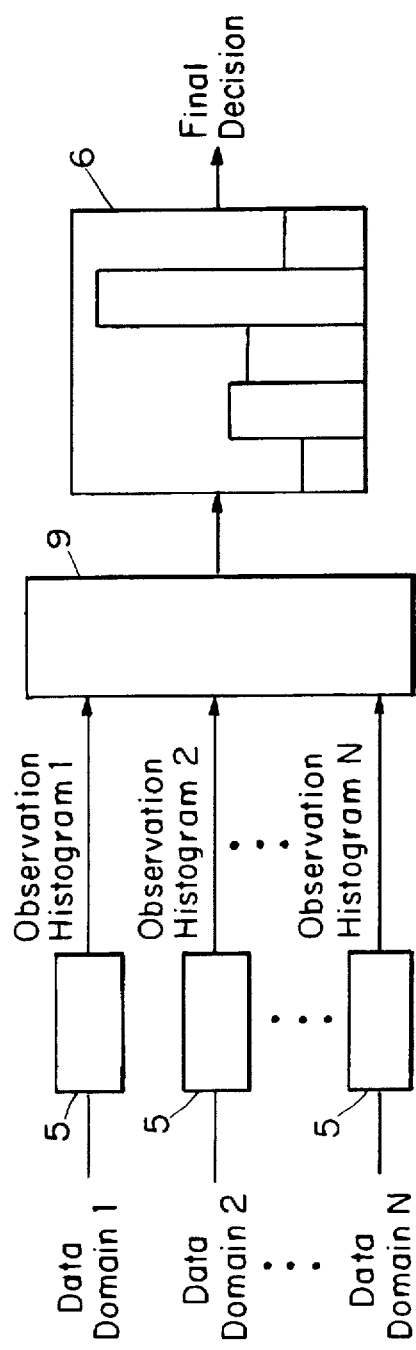
FIG. 6 is a functional block diagram of the data fusion configuration of the present invention.
Figure 9:
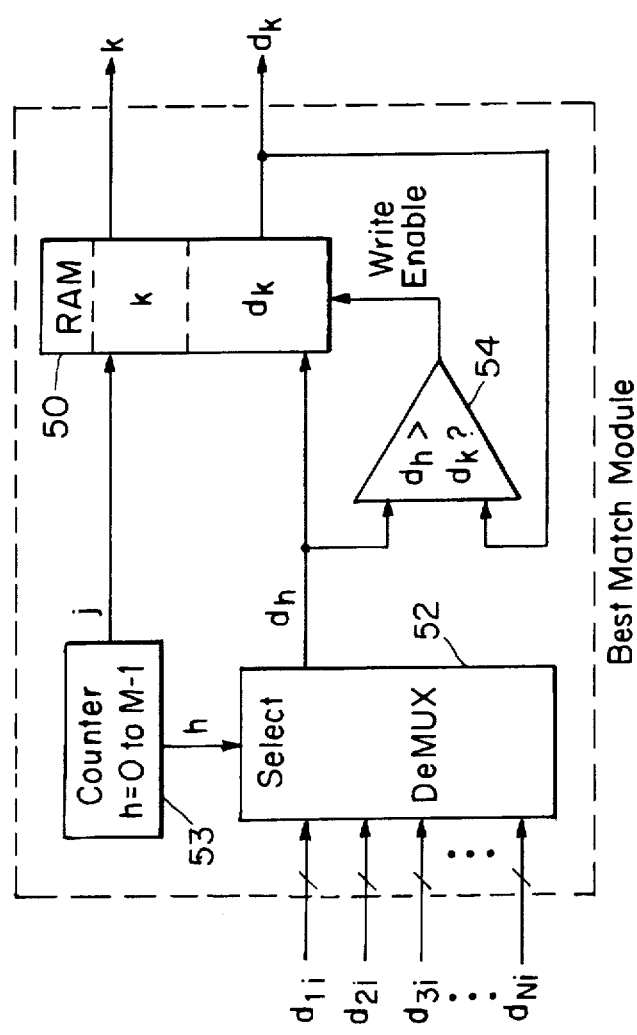
FIG. 9 is a functional block diagram of the Best Match Module of the present invention.

The system of the present invention allows results of classifications from different data types to be fused into a single cumulative classification. This is accomplished by adding another complete pattern recognition system for each data type to be processed. FIG. 6 is a functional block diagram of the system. Each of the systems 5 is trained in accordance with the foregoing description on sets of training patterns of its corresponding data domain type. In the case of classifying persons, one system may be dedicated to classifications based on visual data and would be trained by visual training data patterns. A second system would be trained on voice data training patterns.

During testing, visual data is input to the visual system and voice data is input to the voice-trained system. Each of the systems operates independently to classify a subject based on input test patterns of its own particular data type. However, the individual systems do not produce a final classification decision. Instead, each system outputs its observation class histogram to a processor 9 which combines the observation histograms into a cumulative datafused output histogram 6. In the preferred embodiment, this is done by simply adding the contributions of each class in the individual observation histograms together. A cumulative class contrast is then computed. If the contrast exceeds a threshold, a final classification decision is made, and the subject is labeled as the peak class in the cumulative histogram. If the contrast is below the threshold, the subject is labeled as unknown.

This data fusion process of the invention does not require that all data type pattern recognition systems be operating simultaneously. Rather, because of the statistical method behind the process, individual systems can be turned on and off while the testing process continues. The system is merely summing output histograms from the individual systems to strengthen the confidence in the final decision. If one of these histograms is eliminated because, for example, the voice data has stopped, the system output is not inhibited. Instead, only the contribution from the voice system is eliminated. The system can continue to operate to classify input patterns without the contribution from the system which has been removed.

Figure 7:
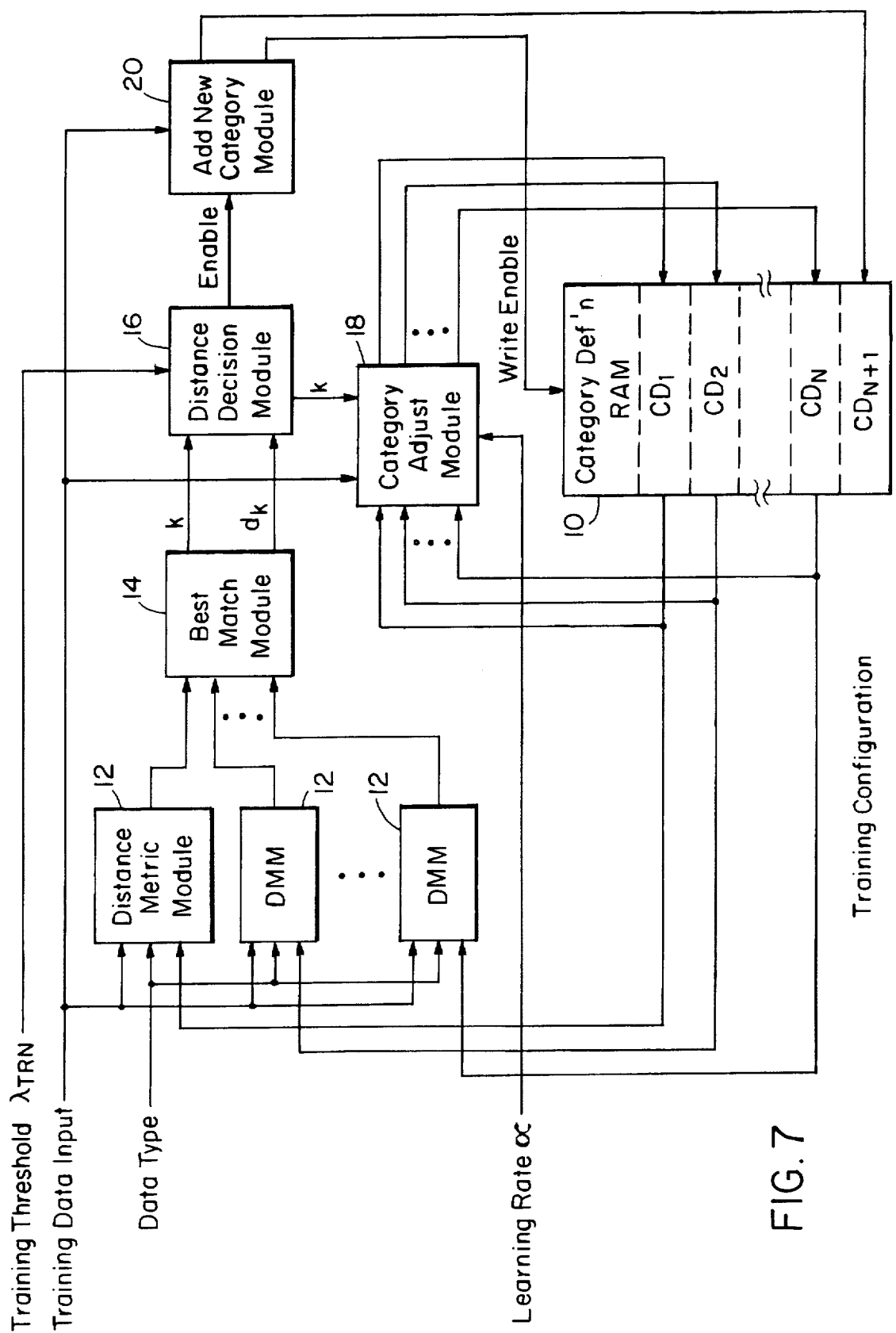
FIG. 7 is a functional block diagram of the system of the present invention in the Training configuration.

FIG. 7 is a functional block diagram of the pattern recognition system of the present invention shown in the training configuration. During training, inputs to the system include the training threshold $\lambda_{TRN}$, the training pattern data input, a training pattern data type indication and the learning rate $\alpha$. The category definition vectors are stored in a category definition RAM 10. The total number of categories at any time is represented by N, and the category definitions are labeled $CD_1$–$CD_N$.

Each category definition is applied to a single Distance Metric Module (DMM) 12. Each of the DMMs 12 also receives the training data input pattern and the data type signal which identifies the data as being either one-dimensional or two-dimensional. Each DMM 12 shifts the input training pattern to several different positions and computes a correlation or distance $d_i$ between its corresponding category definition vector and each shifted version of the input data. All of the calculated distances $d_i$ are input to a Best Match Module (BMM) 14. The BMM 14 outputs the number k of the category which most closely matches the input training pattern and the correlation or distance $d_k$ between the best match category definition vector and the training input pattern vector.

A Distance Decision Module (DDM) 16 receives the user-defined training threshold $\lambda_{TRN}$ and decides if the distance $d_k$ is below the threshold. If $d_k$ is not below the threshold $\lambda_{TRN}$, the training input pattern and the number k of the best match category are forwarded to a Category Adjust Module (CAM) 18 which uses the user-defined learning rate $\alpha$ to adjust the definition of the category k in accordance with the input pattern. The CAM 18 then stores the new category definition back in the category definition RAM 10. If the distance $d_k$ is below the threshold $\lambda_{TRN}$, then the training pattern data is forwarded to an Add New Category Module (ANCM) 20. The DDM 16 transmits an Enable signal to the ANCM 20 to allow the data input pattern vector to be written to the $CD_{N+1}$ location of the category definition RAM 10, thus defining a new category.

Figure 8A:
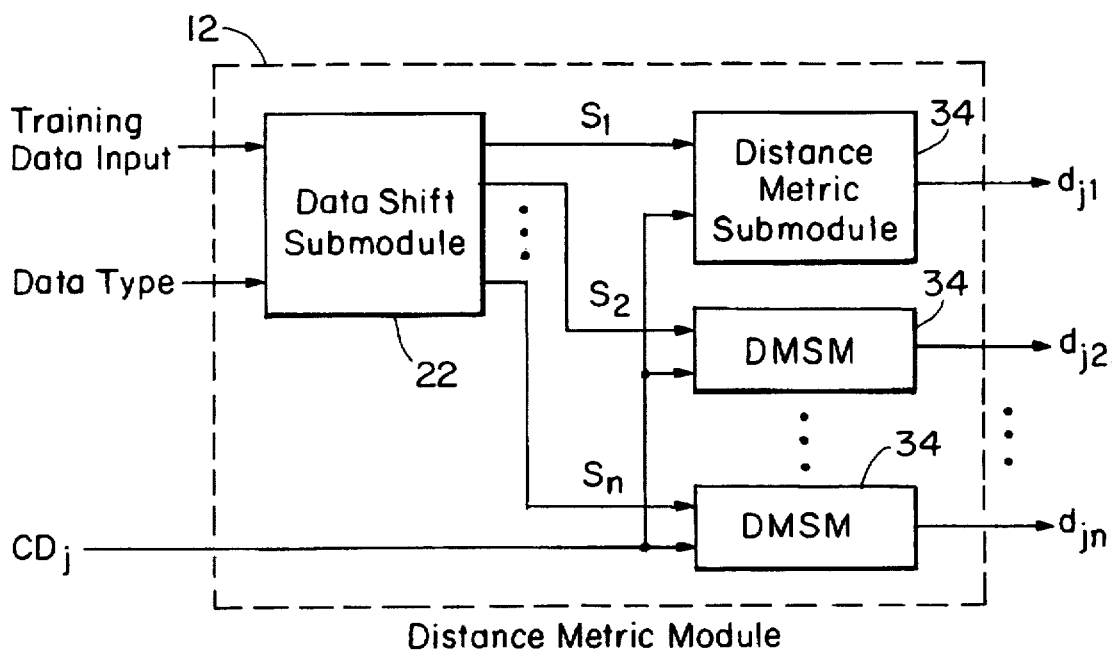
FIG. 8A is a functional block diagram of the Distance Metric Module of the present invention.
Figure 8B:
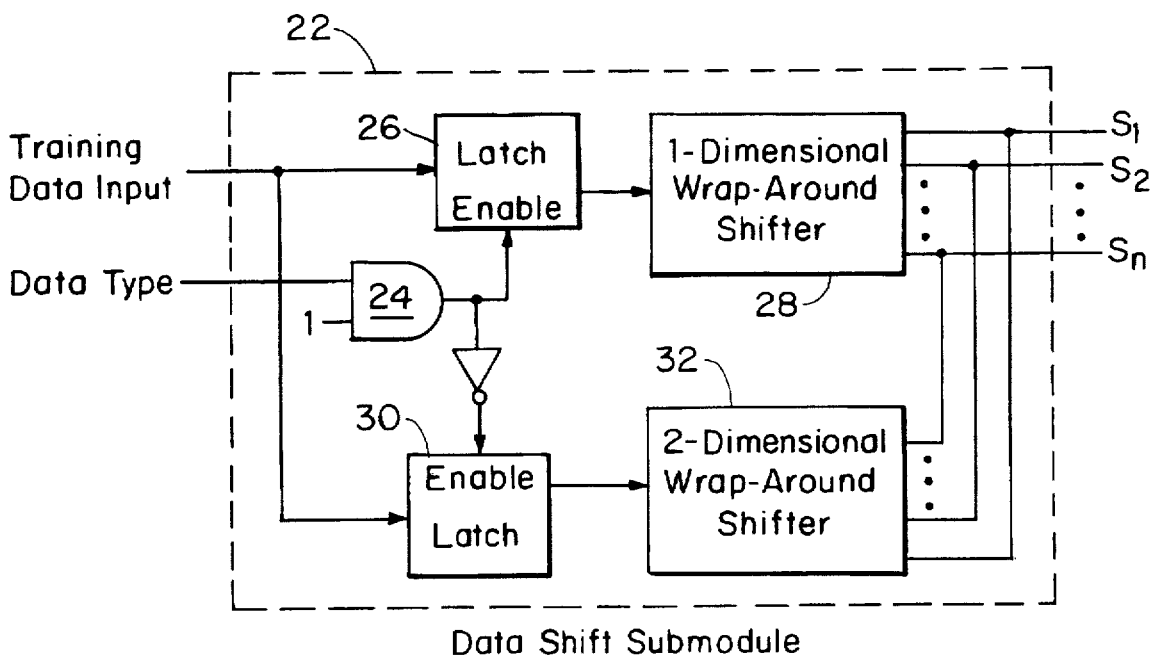
FIG. 8B is a functional block diagram of the Data Shift Submodule within the Distance Metric Module of the present invention.

FIG. 8A is a functional block diagram of a Distance Metric Module (DMM) 12. The DMM 12 receives as inputs the training data input, the data type signal and the definition vector from a single category $CD_j$. The training data input and data type signals are input to a Data Shift Submodule (DSSM) 22, shown functionally in FIG. 8B. The data type signal is applied to AND gate 24. It assumes a logic 0 value for two-dimensional data and a logic 1 value for one-dimensional data. If two-dimensional data is being used, the training data input is enabled through latch 30 to the two-dimensional wrap-around shifter 32. If one-dimensional data is used, latch 26 is enabled to apply the training data input to the one-dimensional wrap-around shifter 28. Each of the shifters 28, 32 generates n shifted versions $s_i$ of the training data input pattern labeled $s_{1-sa}$. Each of these shifted signals $s_i$ is input to a Distance Metric Submodule (DMSM)

Figure 8C:
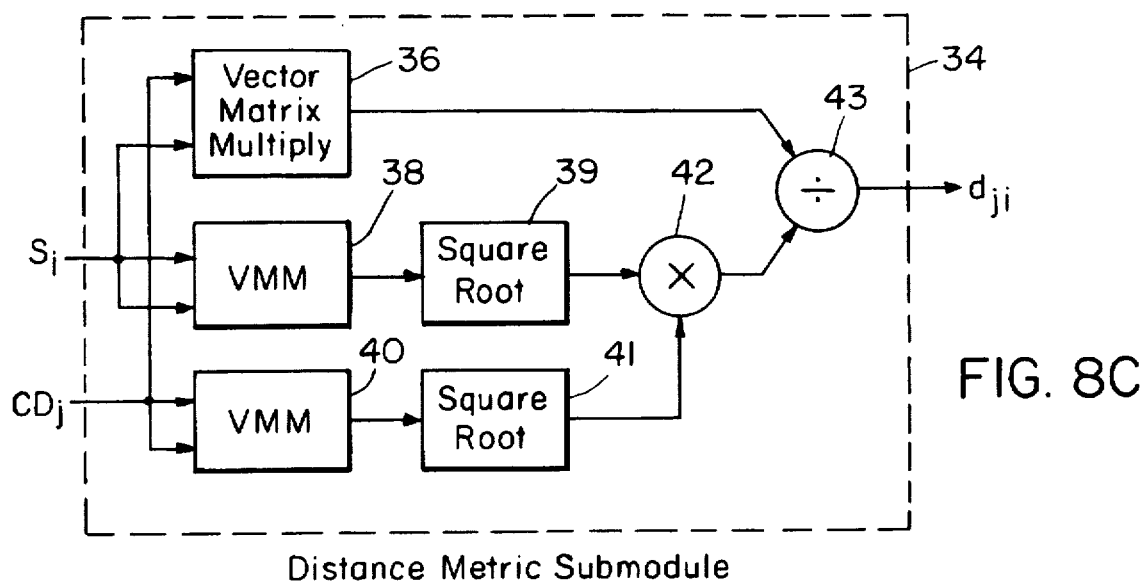
FIG. 8C is a functional block diagram of the Distance Metric Submodule within the Distance Metric Module of the present invention.

34, shown functionally in FIG. 8C. Each DMSM 34 receives a single shifted training input data pattern and the category definition vector $CD_j$ and determines the correlation or distance $d_{ji}$ between the two vectors by computing the equation $$d_{ji} = \frac{s_i \cdot CD_j}{\|s_i\| \|CD_j\|} \quad (5)$$

The magnitude of the shifted data vector $s_i$ is computed by vector matrix multiply (VMM) module 38 and square root module 39. The magnitude of the category definition vector $CD_j$ is computed by VMM 40 and square root module 41. The two magnitudes are then multiplied together by multiplier 42. VMM 36 computes the vector dot product $s_i \cdot CD_j$ between vector $s_i$ and category definition vector $CD_j$ which is then divided at divider 43 by the product obtained at multiplier 42 to produce the output distance $d_{ji}$. Thus, the output from a single DMM 12 includes the correlations or distances $d_{ji}$ between the n shifted input data vectors and the definition vector for a single category j.

The system includes one DMM 12 for each category $CD_j$ numbered from 1 to N, each of which outputs n distances $d_{ji}$. Thus, a total of M=n×N distances are input to the Best Match Module (BMM) 14.

Figure 12:
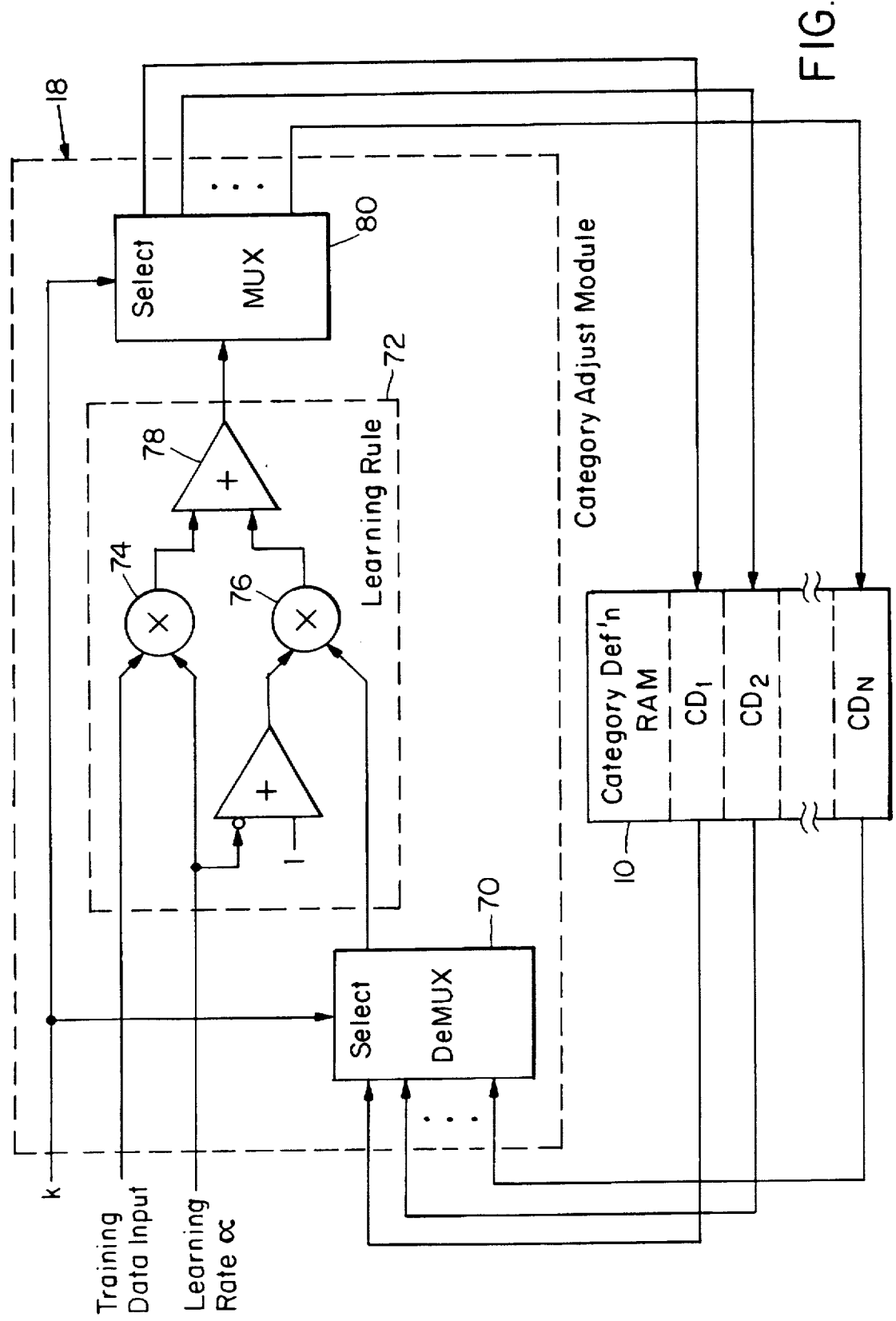
FIG. 12 is a functional block diagram of the Category Adjust Module of the present invention.

FIG. 12 is a functional block diagram of the BMM 14. All of the distances $d_{11}$–$d_{Nn}$ are input to a demultiplexer 52 and are selected one at a time by counter 53 to appear at the output of the demultiplexer 52 as $d_h$. The index h of the counter 53 is incremented from zero up through M-1 to enable the distances $d_{ji}$ one at a time to the output of the demultiplexer 52.

RAM 50 and comparator 54 together serve as a max picker circuit. The RAM 50 stores the present value of k, the number of the category having the highest correlation with the input data pattern. The RAM 50 also stores the actual distance $d_k$ between that category and the input pattern. The present category number j and the current distance $d_h$ being counted are applied to the RAM inputs. Distance $d_h$ is compared at comparator 54 to the present $d_k$ stored at RAM 50. If $d_h$ is greater than $d_k$, the comparator 54 enables $d_h$ to be written to the RAM 50 to become the new $d_k$, and j is written to the RAM 50 as the new category k having the closest correlation to the input. When all of the distances $d_{ji}$ have been processed, the outputs from the BMM 14 give the number of the best match category k and the distance or correlation $d_k$ between that category and the input training data. These outputs are forwarded to the Distance Decision Module (DDM) 16.

Figure 10:
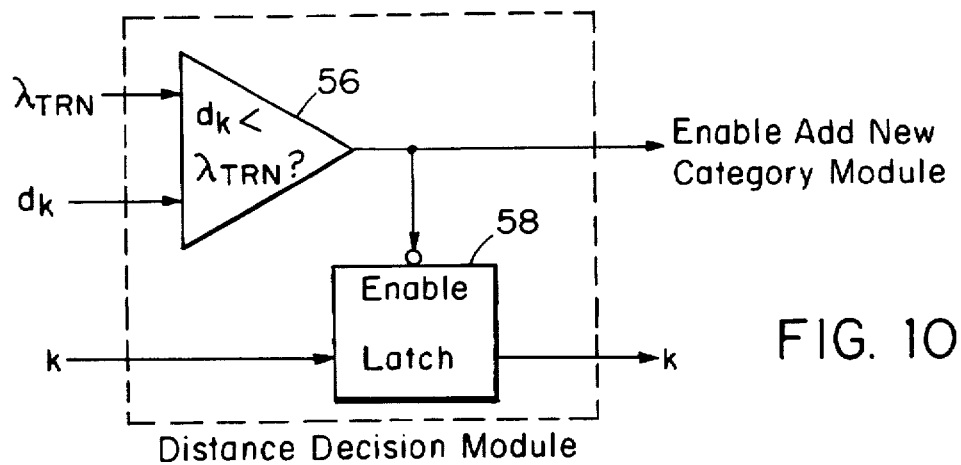
FIG. 10 is a functional block diagram of the Distance Decision Module of the present invention.

The DDM 16 is functionally diagrammed in FIG. 10. The DDM 16 compares at comparator 56 the training threshold $\lambda_{TRN}$ to the distance $d_k$. If $d_k$ is below the threshold, an Enable signal to add a new category is transmitted to the Add New Category Module (ANCM) 20. If the distance $d_k$ is not less than the threshold $\lambda_{TRN}$, then the category number k is enabled through latch 58 to the Category Adjust Module (CAM) 18.

Figure 11:
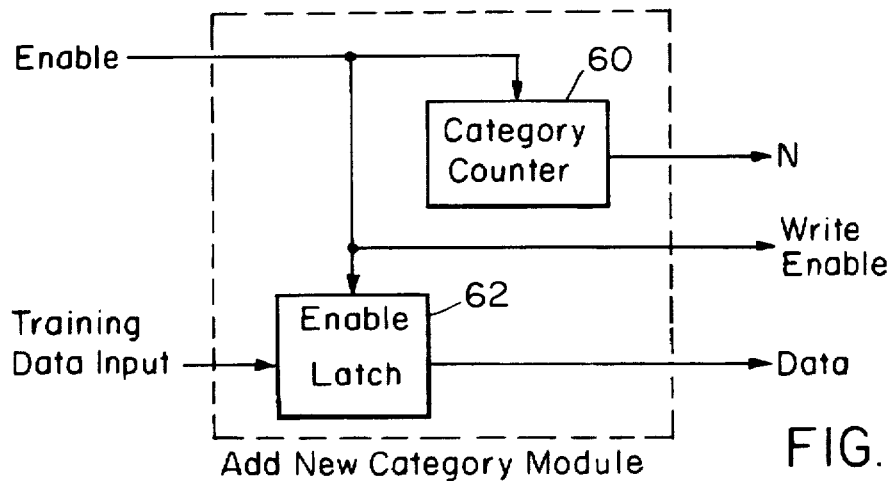
FIG. 11 is a functional block diagram of the Add New Category Module of the present invention.

FIG. 11 is a functional block diagram of the ANCM 20. The ANCM 20 comprises a counter 60 which keeps track of the total number N of categories. If the ANCM 20 is enabled by the DDM 16, the counter is incremented and the new value of N is output to the category definition RAM 10. This new value of N is used by the RAM 10 to point to the next available RAM location for storage of a new category definition vector. When the ANCM 20 is enabled, it sends a Write Enable signal to the RAM 10. It also enables a latch 62 to send the input data vector of the training data pattern to the RAM 10. Thus, the pattern is written to the RAM 10 in the next available location to define a new category.

FIG. 12 is a functional block diagram of the Category Adjust Module (CAM) 18. The CAM 18 receives as inputs the number k of the category whose definition is to be modified, the training input data, and the learning rate α. The category definition to be modified is selected by k and is applied to the learning circuitry 72. The learning circuitry 72 computes the learning equation $$I_k^{NEW} = I_k^{OLD}(1-\alpha) + \alpha I^{INP} \quad (6)$$

derived from equation (2), or, equivalently, $$CD_k^{NEW} = CD_k^{OLD}(1-\alpha) + \alpha I_{INP} \quad (7)$$

The training input data is multiplied by α at multiplier 74. Adder 75 produces $(1-\alpha)$ which is multiplied by category definition $CD_k$ at multiplier 76. These two products are added together at adder 78, and the result is applied to an input of multiplexer 80. The result is passed to the appropriate output of multiplexer 80 by the category number k applied to the select line of the multiplexer 80. The modified category definition $CD_k$ is then replaced in the appropriate location in category definition RAM 10.

Figure 13:
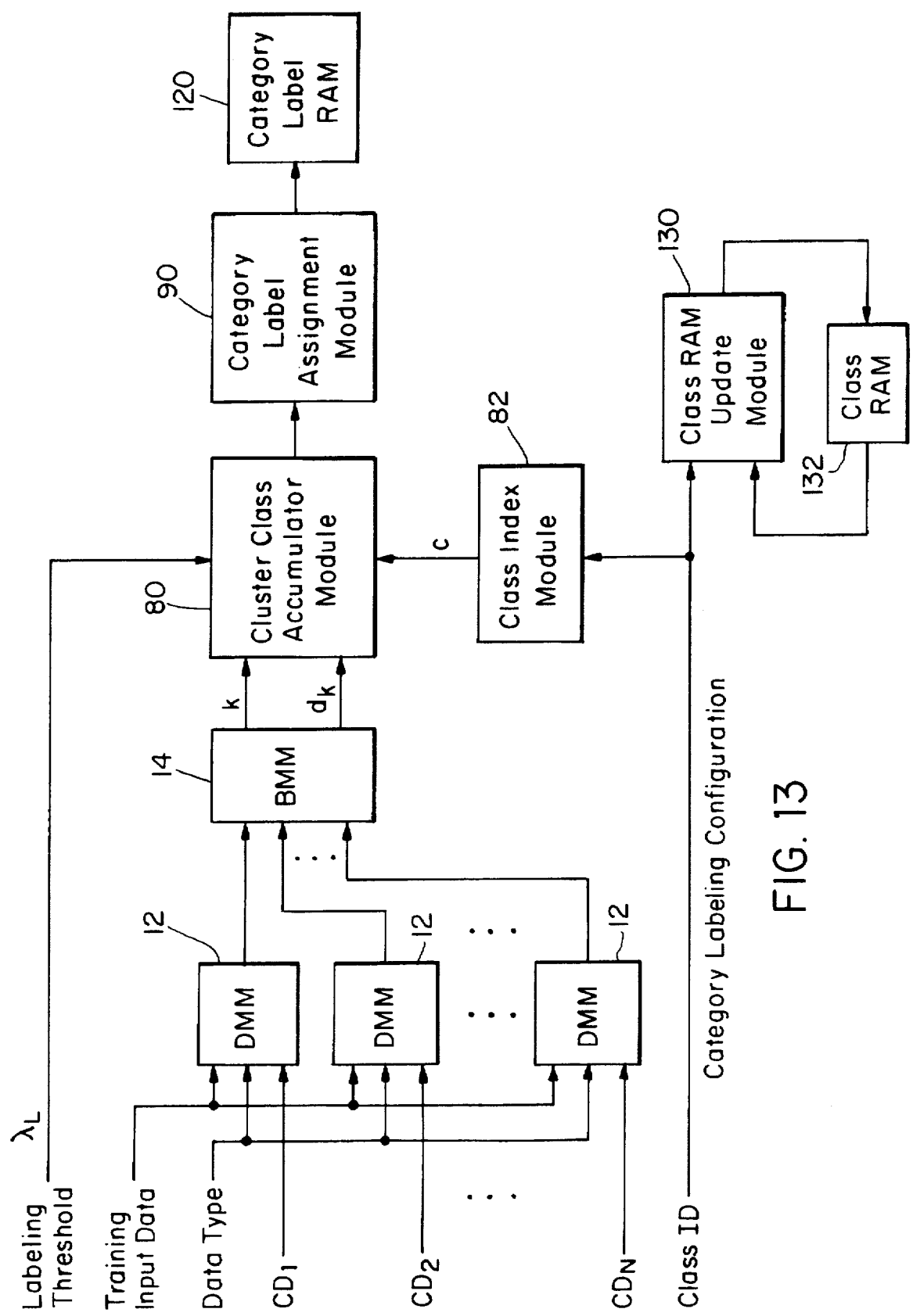
FIG. 13 is a functional block diagram of the system of the present invention in the Category Labeling configuration.

After the training operation is complete, the system assigns labels to the categories according to the classes of training patterns within their corresponding clusters. FIG. 13 is a functional block diagram which shows the category labeling configuration of the system. The DMMs 12 and BMM 14 operate as they do in the training configuration to generate the number k of the best match category and the correlation or distance $d_k$ between that category and the training input data pattern. These two outputs are applied to a Cluster Class Accumulator Module (CCAM) 80. As each training pattern is input during the category labeling phase, the CCAM 80 keeps a count of the occurrences of each class within each individual category cluster.

Figure 14:
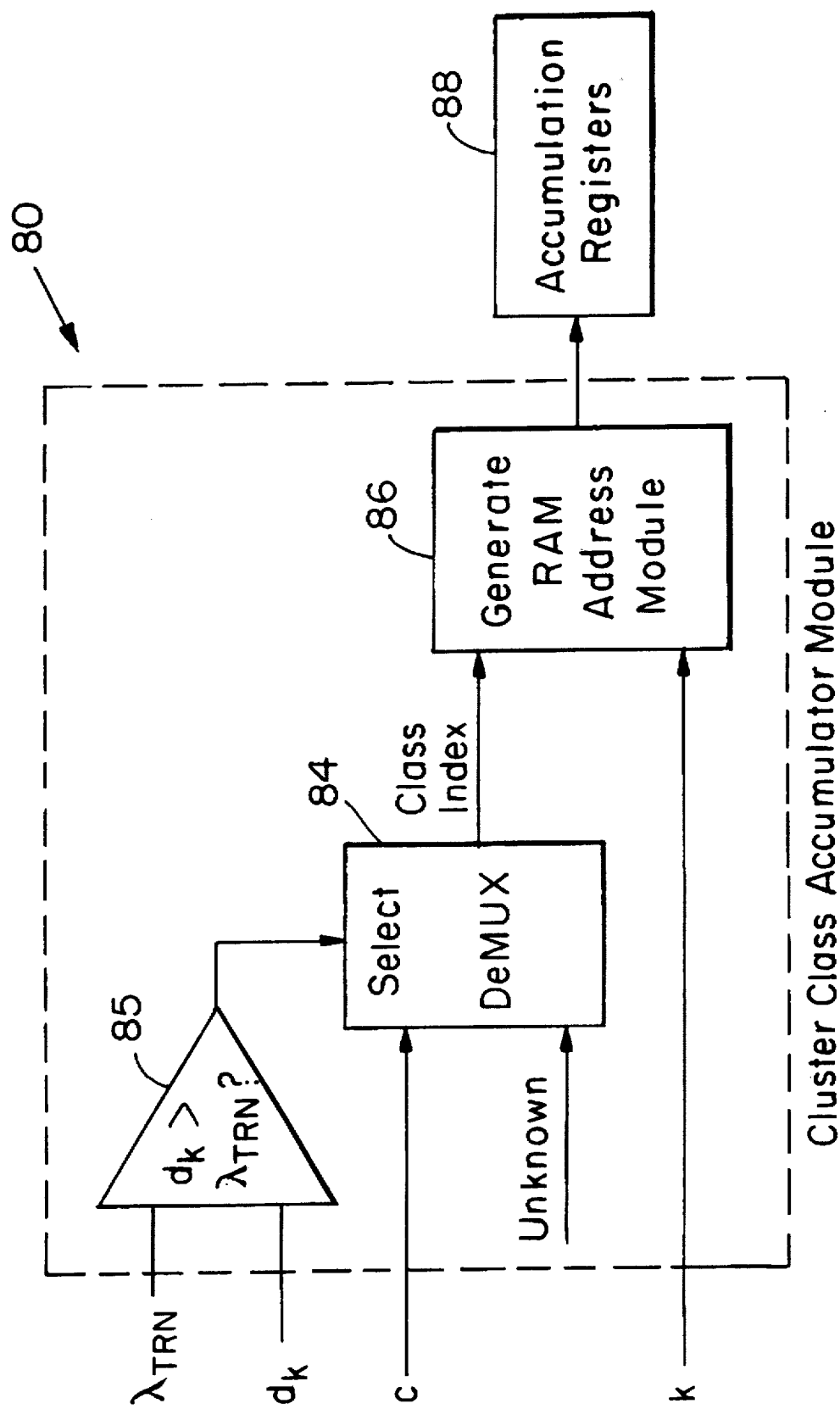
FIG. 14 is a functional block diagram of the Cluster Class Accumulator Module of the present invention.

FIG. 14 is a functional block diagram of the CCAM 80. Referring to both FIG. 13 and FIG. 14, an input class identification is associated with each training input data pattern. The class ID is applied to a Class Index Module 82 which generates a class index C which is applied to an input of a demultiplexer circuit 84 within the CCAM 80. A second input to the demux 84 is an unknown class indicator. Depending upon the condition of the select line to the demux 84, either a known class index or the unknown indicator will be forwarded to a Generate RAM Address Module (GRAM) 86. Distance $d_k$ is compared to the training threshold $\lambda_{TRN}$ at comparator 85. If $d_k$ is greater than the training threshold $\lambda_{TRN}$, then the known class index is forwarded to the GRAM 86. If $d_k$ is below the threshold $\lambda_{TRN}$, then an unknown indicator is received by the GRAM 86.

The GRAM 86 also receives the category number k. The GRAM 86 uses the class index C and the category number k to generate the address of an accumulation register 88 which corresponds to the identified class and category. The count within that register is incremented, and the next training pattern is processed. Thus, each accumulation register 88 keeps track of the number of training patterns received for each class within each category cluster. After the entire training data set has been thus processed, the accumulation registers 88 hold the total counts of training patterns for every class and every cluster.

Figure 15:
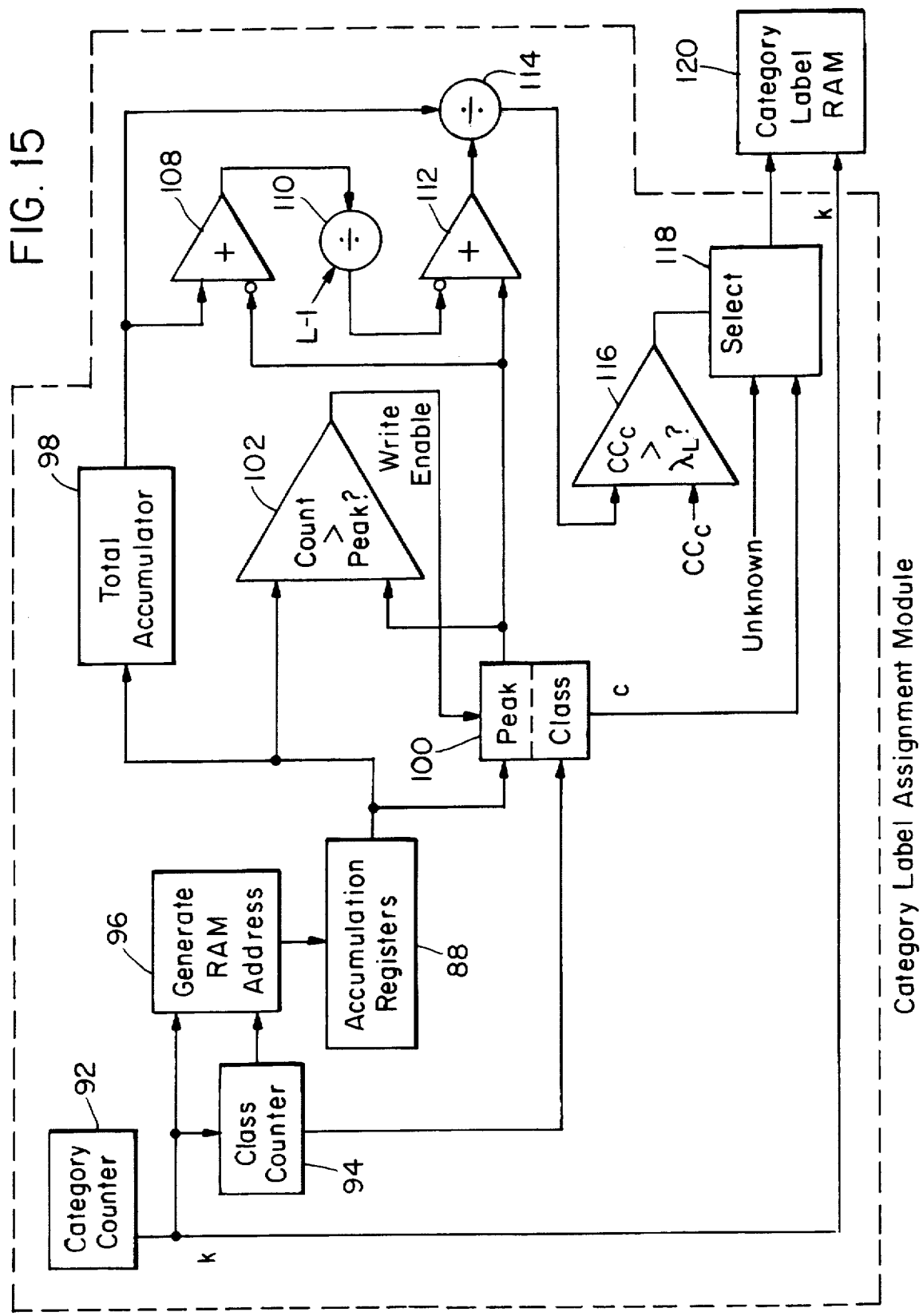
FIG. 15 is a functional block diagram of the Category Label Assignment Module of the present invention.

Categories are assigned class names by the Category Label Assignment Module (CLAM) 90, which is functionally diagrammed in FIG. 15. Counters 92 and 94 increment through the number of categories and classes respectively. Their outputs are forwarded to a Generate RAM Address Module (GRAM) 96 which passes addresses to the accumulation registers 88 to access the pattern counts stored there. Within each category cluster, the count of input patterns for each class are read from the registers 88 one at a time. The count is passed to a total accumulator 98 which keeps track of the total number of patterns within the category cluster. The accumulator 98 is reset between clusters so that only the patterns received within a cluster are counted.

The count for the class being processed along with the class index C are applied to a peak class RAM 100. The present peak count is applied to an input of comparator circuit 102 along with the count from the registers 88. If the count for the class being processed is greater than the peak count, the comparator 102 generates a Write Enable signal which enables the count from the registers 88 to replace the peak count in the peak class RAM 100. The present class index also replaces the old peak class index C.

After all of the classes within a category have been read and their counts have been accumulated, the cluster class contrast $CC_c$ for the category is computed (see equation 3). The mean of the non-peak class pattern counts is computed by first subtracting the peak count from the total count at adder 108 and dividing the result by the number L-1 of non-peak classes in the category at divider 110. This result is subtracted from the number of patterns within the peak class at adding circuit 112. Next, this result is divided by the total number of patterns in the cluster at divider 114. The resulting cluster class contrast $CC_c$ is compared at comparator 116 with the class contrast labeling threshold $\lambda_L$.

The output of the comparator 116 controls the select function of the demultiplexer circuit 118. Depending on the condition of the select line, either the class index C stored in the peak RAM 100 or the unknown indication is passed through the demux 118 to be assigned to the category k at the category label RAM 120. Thus, the RAM 120 identifies the category with either its peak class or an unknown indication. If the cluster class contrast $CC_c$ is greater than the labeling threshold $\lambda_L$, then the peak class index C is passed through the demux 118 to the RAM 120 and the category is thus labeled in accordance with its peak class. If the class contrast $CC_c$ does not exceed the threshold $\lambda_L$, then the category is labeled as unknown.

The class ID of the input pattern is also forwarded to a Class RAM Update Module (CRUM) 130. The class RAM 132 keeps track of all of the classes represented by the training input patterns. Whenever a new class of input pattern is received by the system, the class RAM 132 must be updated to include the new class.

Figure 16:
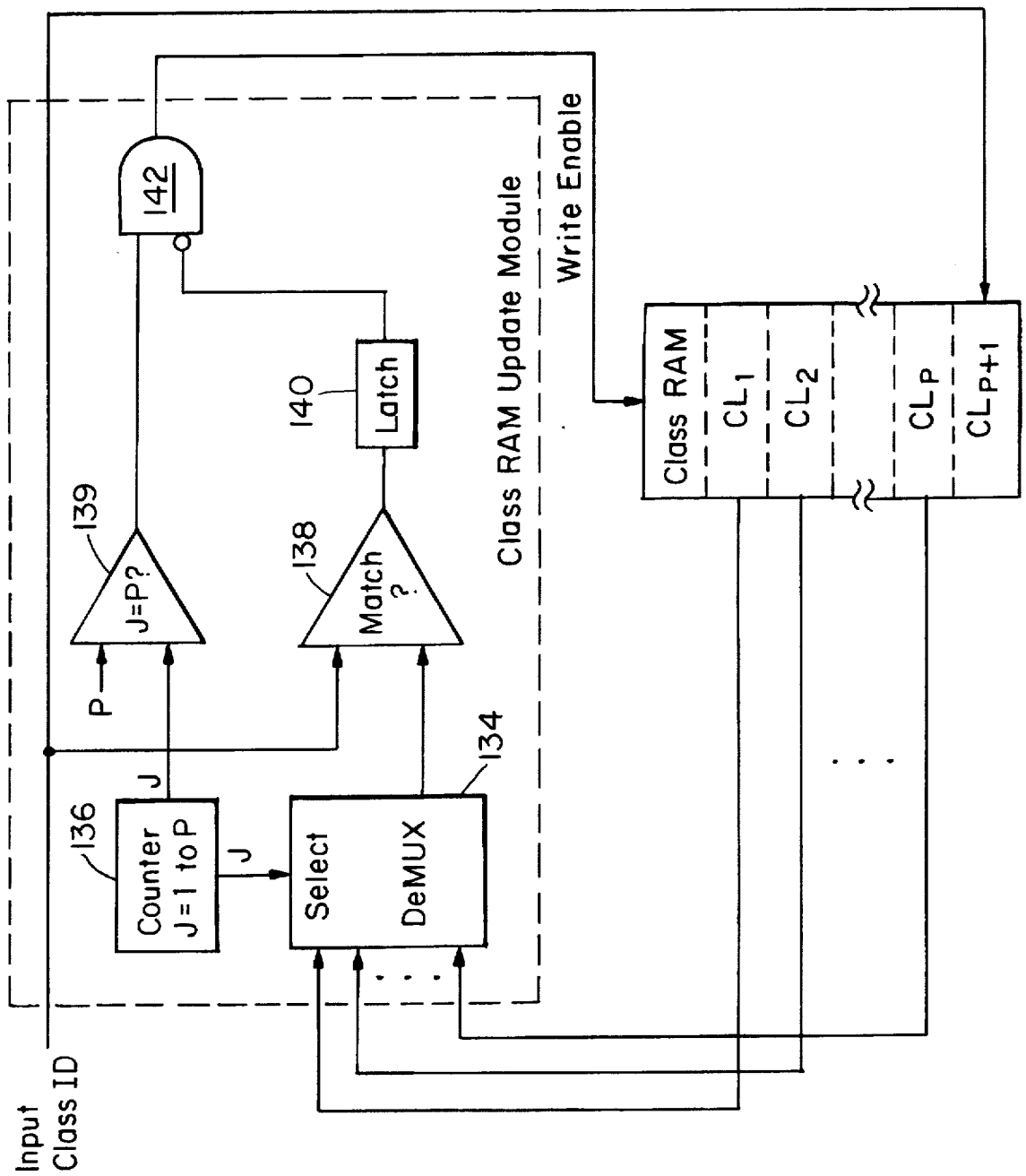
FIG. 16 is a functional block diagram of the Class RAM Update Module of the present invention.

FIG. 16 is a functional block diagram of the CRUM 130 showing its interaction with the class RAM 132. Each of the existing class IDs in the RAM 132 is applied to the inputs of a demultiplexer circuit 134. A counter 136 increments from 1 to the number P of classes presently stored in the class RAM 132. The output of a counter 136 controls the select function of the demultiplexer 134 such that the class IDs appear one at a time at the output of the demux 134 for each count of the counter 136. The output of the demux 134 and the present input class ID are applied to comparator 138. The input class ID is also applied to the next available location (P+1) in the class RAM 132.

As the stored class IDs are output from the demux 134 one at a time, they are compared with the input class ID at comparator 138. If any of the stored class IDs matches the input class ID, the comparator 138 generates a match signal which is stored in latch 140. The output of the latch is applied to AND gate 142. As the counter 136 counts through the number of classes, the index of the counter is compared to the total number of classes P at comparator 144. When the index J of the counter reaches the total number of classes P, the output signal 139 from the comparator 139 becomes active. The AND gate 142 generates a high Write Enable signal if the counter reaches P and there has been no match between the input class ID and any of the class IDs stored in the class RAM 132. Since the new class ID is applied to the next available location in the class RAM 132, when the Write Enable signal becomes active, the class ID is stored in the RAM 132 as a new class ID.

Figure 17:
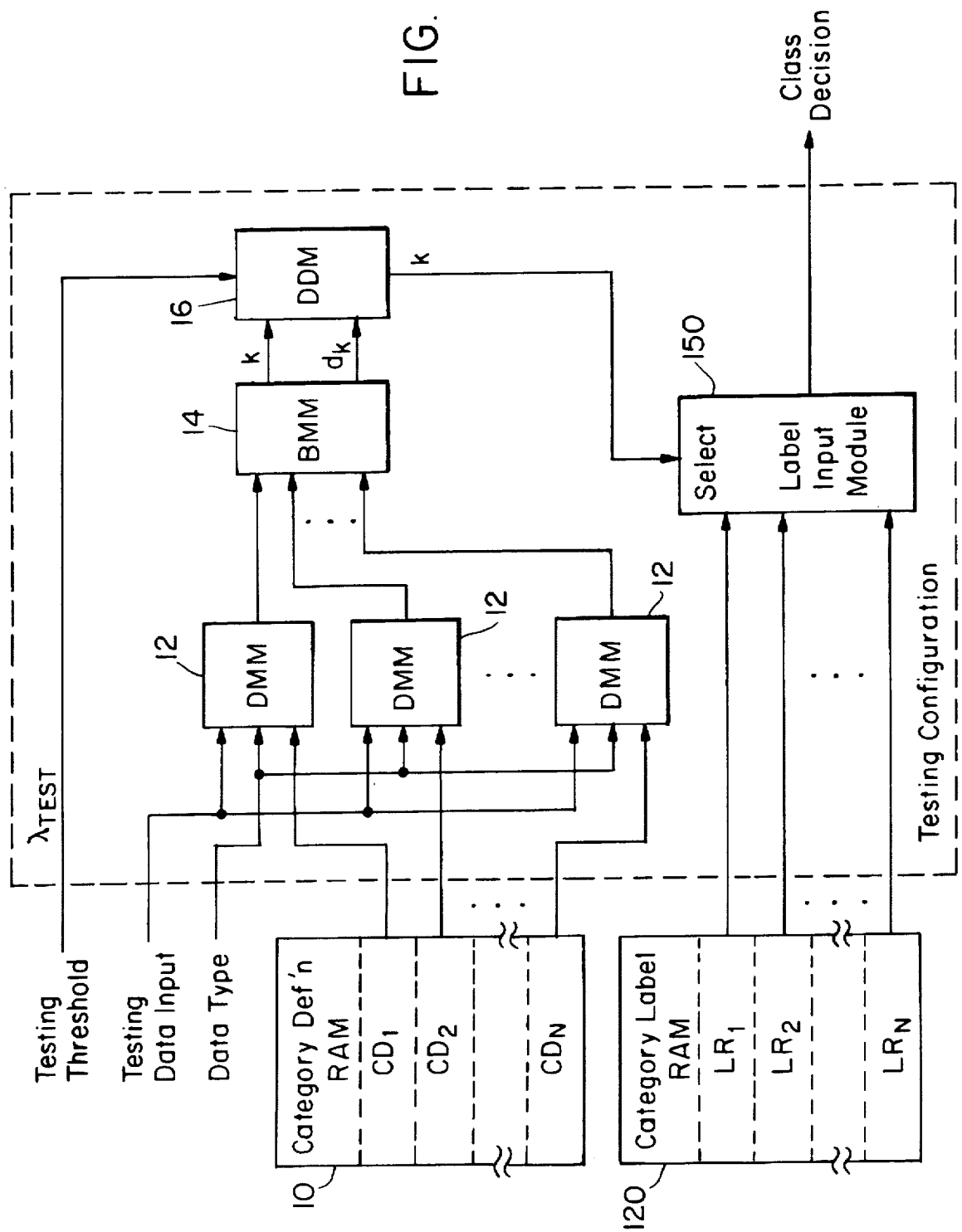
FIG. 17 is a functional block diagram of the system of the present invention in the Testing configuration.

After the training and labeling operations described above are complete, the system is ready to classify input patterns during the testing operation. FIG. 17 is a functional block diagram of the system in the testing configuration. During testing, test input data is received by the system at the DMMs 12. The DMMs 12 and the BMM 14 operate as described above for the training operation to produce the category number k and distance $d_k$ of the best match category. The DMM 16 compares the distance $d_k$ to the testing threshold $\lambda_{TEST}$. If $d_k$ exceeds $\lambda_{TEST}$, category number k is applied to the select line of demultiplexer circuit 150. Category labels from the category label RAM 120 are applied to the inputs of the demux 150. The category number k selects the proper category label from the RAM 120. This label along with the identification of the best match category is output as the category decision. This forms the association between the test pattern frame and a category.

As previously described, in the case of multiple-frame processing, multiple category associations will be formed which include the training pattern statistics for the best match category. These statistics, which can take the form of the training histogram previously described, are stored in the accumulation registers 88. To create the observation histogram for multiple frames of testing data, the appropriate register contents are combined in one of the manners previously described.

While this invention has been particularly shown and described with references to preferred embodiments thereof, it will be understood by those skilled in the art that various changes in form and details may be made therein without departing from the spirit and scope of the invention as defined by the appended claims.

The invention claimed is:

1. A pattern recognition system comprising:

a training subsystem that receives during a training operation a plurality of training input patterns of a data type from a plurality of subject classes, that forms a set of categories of the training input patterns, that assigns each category a category definition according to training input patterns received within the category, that counts the training input patterns received for each class within each category and that generates for each category a training histogram of the training input patterns received within the category, the training histogram including counts of training input patterns received for each class within the category; and a classifier that receives during a testing operation at least one test input pattern of the data type from the subject, that accesses the set of categories and computes a correlation between a category definition and each test input pattern, that forms a category association between each test input pattern and a category based on the correlation and that forms an observation histogram to classify the subject, the observation histogram being formed from each training histogram of each category of each category association and representing counts of training input patterns received by the training subsystem during the training operation, classification of the subject being determined by a peak class of the observation histogram, the peak class representing the highest training input pattern count of the observation histogram.

2. The pattern recognition system of claim 1 wherein the training subsystem assigns to each category a label that is determined by a peak class of the category.

3. The pattern recognition system of claim 2 wherein the set of categories includes a category labeled as unknown such that the subject can be classified as unknown.

4. The pattern recognition system of claim 1 wherein during the training operation, the training subsystem computes a correlation between each training input pattern and a category definition vector for each category.

5. The pattern recognition system of claim 4 wherein if the correlation is below a threshold, a new category is formed.

6. The pattern recognition system of claim 4 wherein if the correlation is above a threshold, an existing category definition vector is modified by an incoming training input pattern according to a learning rule.

7. The pattern recognition system of claim 6 wherein the learning rule comprises creating a new category definition vector by multiplying a learning rate by a difference between the incoming training input pattern and the existing category definition vector and adding that product to the existing category definition vector.

8. The pattern recognition system of claim 4 wherein the correlation includes a vector dot product.

9. The pattern recognition system of claim 1 wherein, during the training operation, an existing category definition vector is modified by an incoming training input pattern by multiplying a learning rate by a difference between the incoming training input pattern and the existing category definition vector and adding that product to the existing category definition vector.

10. The pattern recognition system of claim 1 wherein for each category the training subsystem computes a category class contrast indicative of the degree to which a peak class of the category dominates the other classes of the category.

11. The pattern recognition system of claim 10 wherein if the category class contrast exceeds a threshold, the category is labeled as the peak class.

12. The pattern recognition system of claim 10 wherein if the category class contrast is below a threshold, the category is labeled as unknown.

13. The pattern recognition system of claim 1 further comprising:
   a second training subsystem that receives a second plurality of training input patterns of a second data type from the subject classes and forms a second set of categories;
   a second classifier that receives at least one test input pattern of the second data type from the subject during the testing operation and forms a category association between the at least one test input pattern of the second data type and a category of the second set of categories and forms a second observation histogram; and
   a processor for combining the first and second observation histograms into a cumulative histogram to produce a cumulative classification of the subject within a class.

14. The pattern recognition system of claim 13 wherein at least one data type comprises visual data.

15. The pattern recognition system of claim 13 wherein at least one data type comprises sound data.

16. The pattern recognition system of claim 13 wherein the data types comprise visual and sound data.

17. The pattern recognition system of claim 13 wherein at least one data type comprises voice data.

18. The pattern recognition system of claim 1 wherein the observation histogram for a single test input pattern is a single-frame k-nearest neighbor histogram of a predetermined number k of categories which have the closest correlations to the single test input pattern.

19. A pattern recognition system comprising:
   a source for generating input patterns of multiple data types;
   a plurality of training subsystems, each training subsystem receiving a plurality of training input patterns of a single corresponding data type during a training operation, forming a set of categories of the training input patterns of the data type, generating a category definition for each category according to training input patterns received within the category, counting the number of training input patterns of each class within each category of the data type, and generating a training histogram for each category of the data type, each training histogram including counts of training input patterns of each class within the respective category;
   a plurality of classifiers, at least one classifier receiving during a testing operation at least one test input pattern of its corresponding data type, accessing the categories and computing a correlation between a category definition and each test input pattern, forming a category association between each test input pattern and a category based on the correlation and forming for each data type an observation histogram to classify the subject, the observation histogram being formed from each training histogram of each category of each category association and representing counts of training input patterns received by the training subsystem during the training operation; and
   a processor that combines each observation histogram for each data type into a cumulative histogram to form a cumulative classification of the subject within a class.

20. The pattern recognition system of claim 19 wherein at least one data type comprises visual data.

21. The pattern recognition system of claim 19 wherein at least one data type comprises sound data.

22. The pattern recognition system of claim 19 wherein the data types comprise visual and sound data.

23. The pattern recognition system of claim 19 wherein at least one data type comprises voice data.

24. A method of pattern recognition comprising:
   receiving a plurality of training input patterns of a data type from a plurality of subject classes during a training operation;
   forming a set of categories of the training input patterns;
   generating a category definition for each category according to training input patterns received within the category;
   counting the number of training input patterns received for each class within each category;
   for each category, generating a training histogram of the training input patterns received within the category, the training histogram including counts of training input patterns of each class received within the category;
   receiving at least one test input pattern of the data type from a subject during a testing operation;
   computing a correlation between a category definition and each test input pattern;
   forming a category association between each test input pattern and a category based on the correlation; and forming an observation histogram to classify the subject, the observation histogram being formed from each training histogram of each category of each category association and representing counts of training input patterns received by the training subsystem during the training operation, classification of the subject being determined by a peak class of the observation histogram, the peak class representing the highest training input pattern count of the observation histogram.

25. The method of claim 24 further comprising assigning to each category a label that is determined by a peak class of the category.

26. The method of claim 25 wherein assigning a label includes assigning a label of unknown to a category such that the subject can be classified as unknown.

27. The method of claim 24 wherein the training operation includes computing a correlation between each training input pattern and a category definition vector of each category.

28. The method of claim 27 wherein if the correlation between a training input pattern and a best match category definition vector is below a threshold, a new category is defined.

29. The method of claim 27 wherein if the correlation between a training input pattern and a best match category definition vector is above a threshold, the best match category definition vector is modified by the training input pattern according to a learning rule.

30. The method of claim 29 wherein the learning rule comprises creating a new category definition vector by multiplying a learning rate by a difference between the training input pattern and the existing category definition vector and adding that product to the existing category definition vector.

31. The method of claim 27 wherein the correlation includes a vector dot product.

32. The method of claim 24 wherein, during the training operation, an existing category definition vector is modified by an incoming training input pattern by multiplying a learning rate by a difference between the incoming input training pattern and the existing category definition vector and adding that product to the existing category definition vector.

33. The method of claim 24 wherein the training operation includes computing for each category a category class contrast indicative of the degree to which a peak class of the category dominates the category.

34. The method of claim 33 wherein if the category class contrast exceeds a threshold, the category is labeled as the peak class.

35. The method of claim 33 wherein if the category class contrast is below a threshold, the category is labeled as unknown.

36. The method of claim 24 wherein forming an observation histogram comprises generating for a single test input pattern a single-frame k-nearest neighbor class histogram of a predetermined number k of categories which have the closest correlation with the single test input pattern.

37. A pattern recognition system comprising:

a memory having stored therein a set of categories of training input patterns received from a plurality of subject classes during a training operation, each category having a category definition according to training input patterns received within the category, and each category being associated with a training histogram of the training input patterns received within the category, the training histogram including counts of training input patterns received for each class within the category; and a classifier that receives during a testing operation at least one test input pattern from the subject, that accesses the set of categories and computes a correlation between a category definition and each test input pattern, that forms a category association between each test input pattern and a category based on the correlation and that forms an observation histogram to classify the subject, the observation histogram being formed from each training histogram of each category of each category association and representing counts of training input patterns received by the training subsystem during the training operation, classification of the subject being determined by a peak class of the observation histogram, the peak class having the highest training input pattern count of the observation histogram.

38. The pattern recognition system of claim 37 wherein the set of categories includes a category labelled as unknown such that the subject can be classified as unknown.

39. The pattern recognition system of claim 37 wherein the observation histogram for a single test input pattern is a single-frame k-nearest neighbor histogram of a predetermined number k of categories which have the closest correlations to the single test input pattern.

40. A method of pattern recognition comprising:

providing a set of categories of training input patterns received from a plurality of subject classes during a training operation, each category having a category definition according to training input patterns received within the category and each category having a training histogram of the training input patterns received within the category, the training histogram including counts of training input patterns of each class received within the category;

receiving at least one test input pattern from a subject during a testing operation;

computing a correlation between a category definition and each test input pattern;

forming a category association between each test input pattern and a category based on the correlation; and forming an observation histogram to classify the subject, the observation histogram being formed from each training histogram of each category of each category association and representing counts of training input patterns received by the training subsystem during the training operation, classification of the subject being determined by a peak class of the observation histogram, the peak class representing the highest training input pattern count of the observation histogram.

* * * * *